(12) United States Patent
Haider et al.

(10) Patent No.: US 10,837,897 B2
(45) Date of Patent: Nov. 17, 2020

(54) SYSTEM, METHOD AND APPARATUS FOR MEASURING POLARIZATION USING SPATIALLY-VARYING POLARIZATION BEAMS

(71) Applicants: Shahid Abbas Haider, Waterloo (CA); Alexander Sheung Lai Wong, Waterloo (CA); Farnoud Kazemzadeh, Waterloo (CA)

(72) Inventors: Shahid Abbas Haider, Waterloo (CA); Alexander Sheung Lai Wong, Waterloo (CA); Farnoud Kazemzadeh, Waterloo (CA)

( * ) Notice: Subject to any disclaimer, the term of this patent is extended or adjusted under 35 U.S.C. 154(b) by 114 days.

(21) Appl. No.: 16/243,780

(22) Filed: Jan. 9, 2019

(65) Prior Publication Data

US 2019/0212253 A1 Jul. 11, 2019

Related U.S. Application Data

(60) Provisional application No. 62/615,067, filed on Jan. 9, 2018.

(51) Int. Cl.
*G01J 4/00* (2006.01)
*G01N 21/21* (2006.01)

(52) U.S. Cl.
CPC ..... *G01N 21/21* (2013.01); *G01N 2201/0683* (2013.01)

(58) Field of Classification Search
CPC ... G01J 4/04; G01J 4/00; G01N 21/21; G01N 21/23; G01N 21/211
USPC ......................................................... 356/367
See application file for complete search history.

(56) References Cited

U.S. PATENT DOCUMENTS

2003/0038944 A1* 2/2003 Hamalainen .............. G01J 5/60
356/432
2003/0228682 A1* 12/2003 Lakowicz ............ G01N 21/648
435/287.2

* cited by examiner

*Primary Examiner* — Md M Rahman
(74) *Attorney, Agent, or Firm* — Tai W. Nahm; Miller Thomson LLP

(57) ABSTRACT

There is disclosed a system and method for measuring the polarization of light which utilizes a spatially-varying polarization beam. This measurement is analyzed and improved using novel imaging methods and image processing methods on a digital signal processing (DSP) system to determine the polarization of light. Various embodiments are described which can measure light polarization, determine polarizing material distributions, determine the optical rotary dispersion of samples, and determine the circular dichroism of samples. In certain embodiments, the binding constants and binding activity of molecular samples can be achieved. Given its reduced complexity and size, the system may be configured to be portable such that the system may be used in various applications outside of a lab setting.

24 Claims, 22 Drawing Sheets

SYSTEM, METHOD AND APPARATUS FOR MEASURING POLARIZATION USING SPATIALLY-VARYING POLARIZATION BEAMS

FIELD

The present disclosure relates generally to the field of measurements of polarized light, and more particularly to identification of matter using the light polarization measurements.

BACKGROUND

The polarization of a light wave is a description of its transverse behavior as it propagates through three-dimensional space. This also commonly referred to as the vectorial description of the light wave as the intensity of the light wave can be broken into a set of orthogonal basis vectors whose intensity functions satisfy the wave equation. When polarized light interacts with non-homogeneous matter, the relative intensity functions between the basis vectors can change in non-uniform ways, producing a new light polarization. In matter whose composition is known a priori, the relative intensity change can be modelled, and using this model, additional descriptors of this matter can be inferred. In addition, if several materials are layered in an unknown distribution, the final polarization of the light wave can be used to infer the distribution of the material in a solution.

Currently available light polarization measuring devices are intensity based, require complex optics and electromechanical parts to ensure accurate measurement. These additional components drive up the cost, size, and complexity of these devices, making them inaccessible to certain sectors and applications.

Therefore, what is needed an improved system and method for measuring the polarization of light which reduces the complexity and cost, in order to significantly increase the possible applications.

SUMMARY

The present disclosure describes a system, method and apparatus for measuring the polarization of light utilizing a spatially-varying polarization beam. This measurement is analyzed and improved using novel imaging and image processing methods on a digital signal processing (DSP) system to determine the polarization of light.

In an aspect, there is disclosed a method of measuring polarization of light, comprising: providing an illumination source for producing an illumination beam; passing the illumination beam through a first polarizer to create an illumination beam with a homogeneous spatial polarization profile; passing the illumination beam with a homogeneous spatial polarization profile through a spatially heterogeneous half wave retarder and generating a spatially-inhomogeneous polarized beam; detecting a change in the spatially-inhomogeneous polarized beam utilizing a sensor-array upon introduction of a sample in the path of the spatially-inhomogeneous polarized beam; and digitally processing any change in the spatially-inhomogeneous polarized beam detected by the sensor-array to identify a physical characteristic of the sample.

In an embodiment, there is provided a method of measuring polarization of light, comprising: (i) providing an illumination source for producing an illumination beam; (ii) passing the illumination beam through a first polarizer to create an illumination beam with a homogeneous spatial polarization profile; (iii) passing the illumination beam with a homogeneous spatial polarization profile through a spatially heterogeneous half wave retarder and generating a spatially-inhomogeneous polarized beam; (iv) detecting a change in the spatially-inhomogeneous polarized beam utilizing a sensor-array upon introduction of a sample in the path of the spatially-inhomogeneous polarized beam; and (v) digitally processing any change in the spatially-inhomogeneous polarized beam detected by the sensor-array to identify a physical characteristic of the sample.

In an embodiment, there is provided a component of two conjugate lenses with a spatial filter (which could be, but not limited to, a pinhole or phase array) between them that will reject non-ballistic rays when heterogeneously polarised beam passes through a highly scattering sample.

In an embodiment, the sensor-array is a two-dimensional sensor array, and the method further comprises, after step (iii), passing the spatially-inhomogeneous polarized beam through a second polarizer oriented at an arbitrary angle relative to the first polarizer.

In another embodiment, the method further comprises passing the spatially-inhomogeneous polarized beam through a wavefront manipulation mechanism before step (iv).

In another embodiment, the method further comprises utilizing one or more of a lens, a micro-lens array, and mirrors as the wavefront manipulation mechanism.

In another embodiment, the method further comprises providing a diffraction grating to disperse the beams; and measuring the beams' dispersed intensity profile utilizing the two-dimensional sensor array.

In another embodiment, the method further comprises providing a wavefront manipulation mechanism to focus the dispersed beam onto the two-dimensional sensor array.

In another embodiment, the method further comprises providing a sample containing a target molecule in a solution; and detecting the target molecule in the sample solution based on a change in the spatially-inhomogeneous polarized beam after passing through the sample solution.

In another embodiment, the method further comprises providing an optic that splits the beam by power; and for a first split beam, utilizing a birefringent crystal to cause lateral displacement between two orthogonal linear polarization states; for a second split beam, reflecting the mean through a circular polarizer; wherein the first and second split beams are detected on different areas of a two-dimensional sensor array; and measuring the intensity profiles of the first split beam and the second split beams to determine an ellipticity of the illumination beam after passing through a sample.

In another embodiment, the method further comprises providing a diffraction grating to disperse the beams; and measuring the intensity profile of the beams to determine the elliptisity of the light across many wavelengths simultaneously.

In another embodiment, the method further comprises providing a low-efficiency diffraction grating.

In another embodiment, the method further comprises providing a sample containing a target molecule in a solution; and detecting the target molecule in the sample solution based on a change in the spatially-inhomogeneous polarized beam after passing through the sample solution.

In another embodiment, the method is further reduced to measure the polarization of light. Rather than splitting the power of the beam, it maintains the single beam and after the sample passes through a single linear polarizer. This intensity profile is measured and processed to determine the complete polarization description of the incoming beam.

A system and apparatus for performing the above described methods is also presented and discussed.

Advantageously, the present system and method provides a solution for measuring the polarization of light at significantly reduced cost due to significant reduction of complexity and size of the components. Also, by providing a platform suitable for portable operation in certain embodiments, the number of applications with which polarization technology may be used is greatly increased.

DETAILED DESCRIPTION

Figure 1:
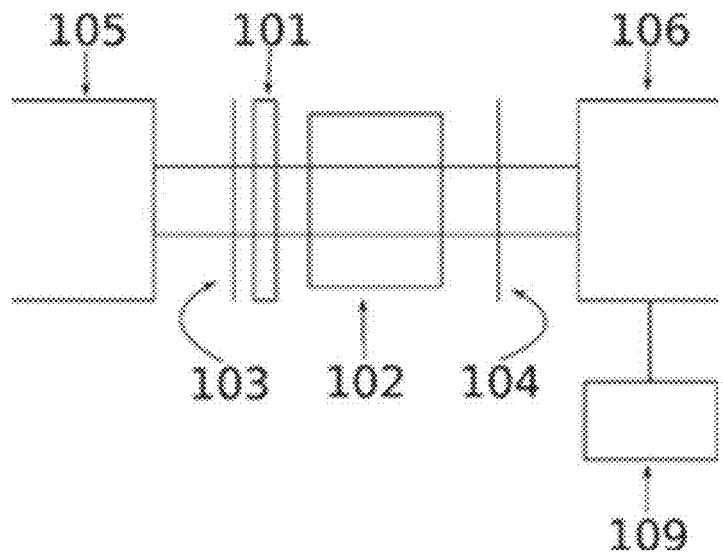
FIG. 1 shows an illustrative system and method for performing light polarization measurement in accordance with embodiment 1.

As noted above, the present disclosure relates generally to a system and method for measuring the polarization of light. This system utilizes a spatially-varying polarization beam to measure the polarization of light. This measurement is analyzed and improved using novel imaging methods and image processing methods on a digital signal processing (DSP) system to determine the polarization of light.

Before explaining at least one embodiment in detail, it is to be understood that the invention is not limited in its application to the details of construction and to the arrangements of the components set forth in the following description or the examples provided therein, or illustrated in the drawings. Therefore, it will be appreciated that a number of variants and modifications can be made without departing from the scope of the invention as described herein. The invention is capable of other embodiments and of being practiced and carried out in various ways. Also, it is to be understood that the phraseology and terminology employed herein are for the purpose of description and should not be regarded as limiting.

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the embodiments described herein. However, it will be understood that the embodiments described herein may be practiced without these specific details. In other instances, well-known methods, procedures and components have not been described in detail, so as not to obscure the embodiments described herein. Furthermore, this description is not to be considered as limiting the scope of the embodiments described herein in any way, but rather as merely describing the implementation of various illustrative embodiments described herein.

First Embodiment

With reference to FIG. 1, shown is a system and method for measuring the polarization of light in accordance with an illustrative first embodiment. An optical system comprises a continuously heterogeneous half-wave retarder plate 101, sample 102, and two linear polarizers 103 and 104. As discussed below, these components of the optical system in FIG. 1 may be shared between all other embodiments as shown in FIGS. 2, 3, 9, 10, 13, 15, 17, 19, 22, 23, and 25. While, for illustrative purposes, the body of the optical system is shown in transmission, it will be appreciated that the optical system can also be arranged to work in reflection without limiting the embodiments described herein. An illustrative example of a reflection version of embodiment 1 is shown in FIG. 3, but with the sample 302 having a reflective surface.

Still referring to FIG. 1, in addition to the body of the optical system as shown and described, there is shown a monochromatic illumination source 105, a two-dimensional sensor array 106, and a DSP system 109. In this illustrative first embodiment, a collimated beam is produced by the monochromatic illumination source 105 and passed through a first linear polarizer 103. This results in a collimated optical beam with a homogeneous spatial polarization profile. This beam then interacts with the continuously heterogeneous half-wave retarder plate 101 (e.g. a vortex half-wave plate) and then becomes a spatially-inhomogeneous polarized beam where the polarization orientation is a function of the azimuthal angle of the beam.

The beam then interacts with the sample 102 and the polarization of the beam will change as a function of the sample 102's polarizing properties. After leaving the sample 102, the beam passes through a second and final linear polarizer 104, oriented as an arbitrary angle relative to the first polarizer 103, and then it is incident on two-dimensional sensor array 106. A measurement of the beam's intensity profile is made by the two-dimensional sensor array 106. This measurement is then passed into the DSP system 109 where it is processed by a series of image processing methods to determine the polarization of light.

Figure 2:
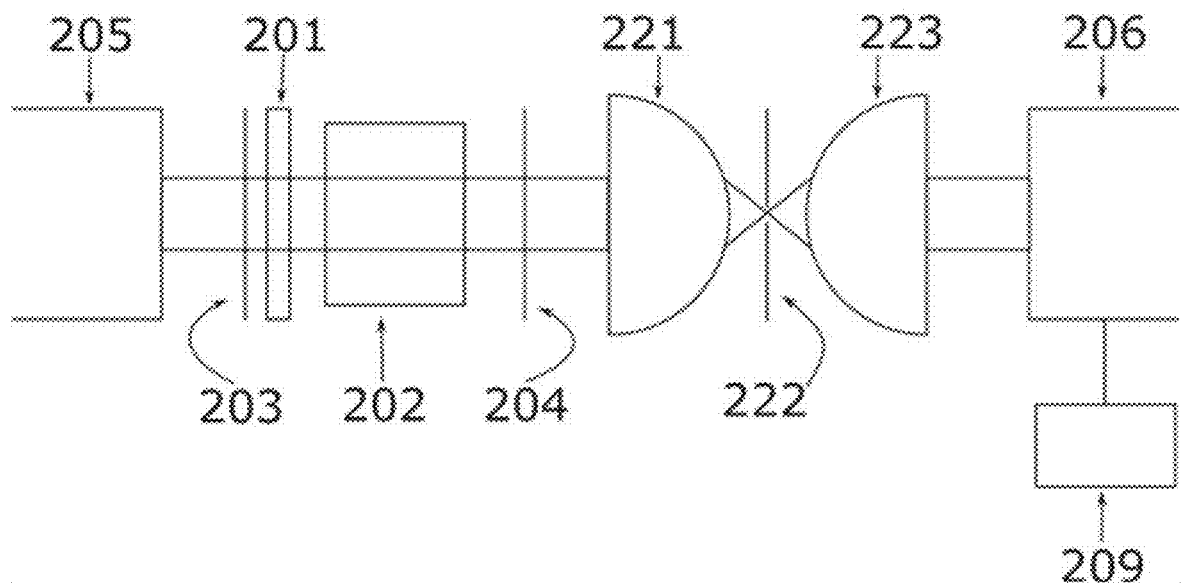
FIG. 2. Shows an illustrative system and method for performing light polarization measurement in accordance with embodiment 1, but with a modular component after a sample that rejects scattered rays when measuring light polarization through highly scattering media.
Figure 3:
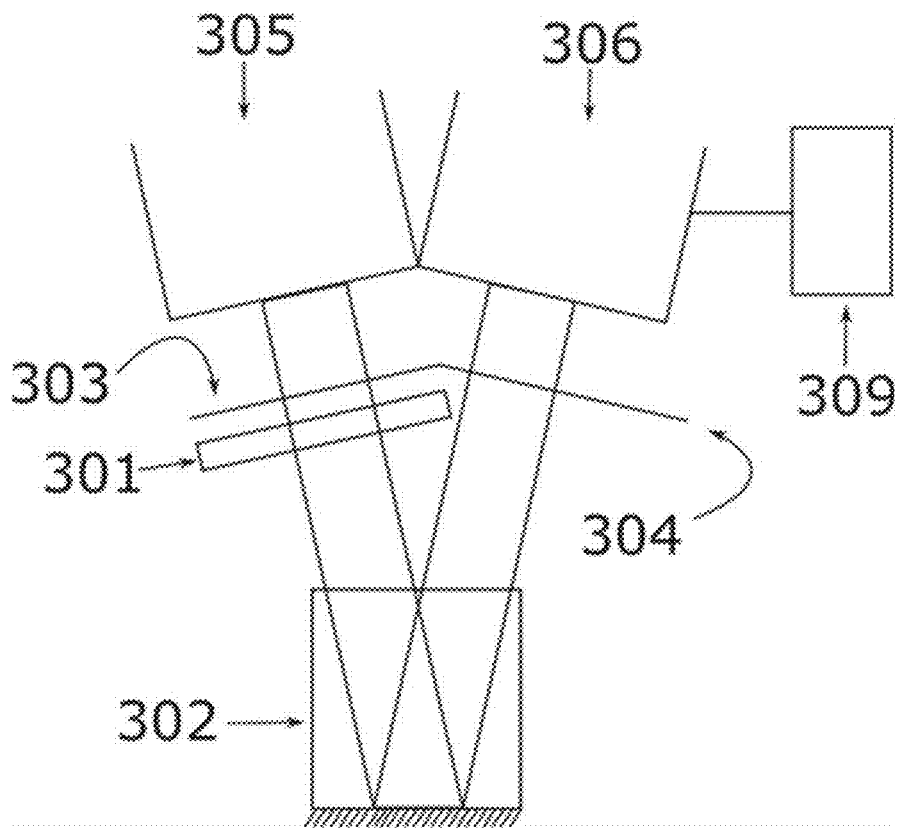
FIG. 3 shows an illustrative system and method for performing light polarization measurement in accordance with embodiment 1, but through reflection rather than transmission.

Now referring to FIG. 2, a modular set of components (a lens 221, a spatial filter 222 (which could be, but is not limited to, a pinhole or phase array), and a lens 223) can be added to this embodiment that will reject rays that do not travel straight (i.e. ballistic rays) through the system. The lens 221 will thus focus the light into the spatial filter 222, and then the lens 223 will collimate the light focused at the filter. The lens 223 is not limited to being conjugate with lens 221 but must collimate the light. This implies that the beam leaving 223 does not need to be the same size as the beam entering 221. It will be appreciated that this configuration of a modular set of components can be added to any of the following embodiments, after the sample 202. The rejection of these scattered rays will increase signal fidelity, and improve any further conclusions drawn from the methods and apparatus explained in this specification.

FIG. 3 shows an illustrative system and method for performing light polarization measurement in accordance with embodiment 1, but through reflection rather than transmission. In this illustrative example, an illumination source 305 projects light through a first linear polarizer 303, and through a continuously heterogeneous half-wave retarder plate 301. The light is projected through a sample and reflected off of a mirror surface to pass through a second linear polarizer 304, and into a two-dimensional sensor array 106. This measurement may then be passed into the DSP system 309, where it is processed by a series of image processing methods to determine the polarization of light.

Figure 4:
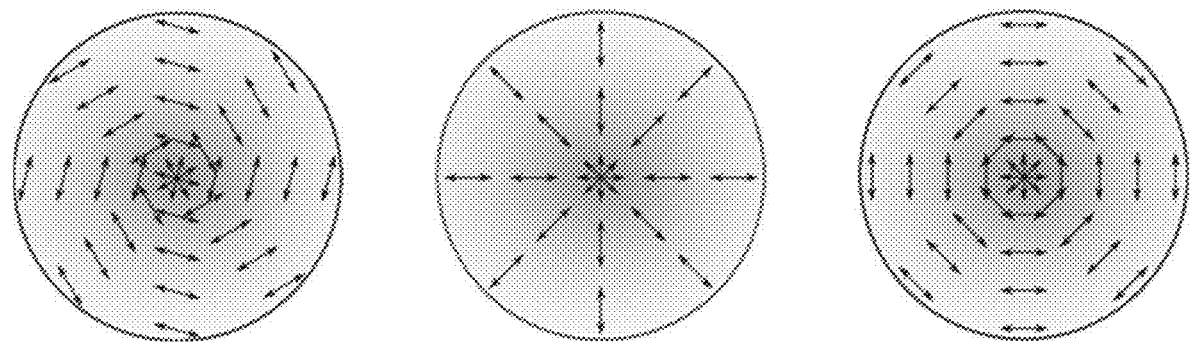
FIG. 4 shows an illustration of three azimuthally changing beam profiles.

Now referring to FIG. 4, shown are three examples of spatially-varying polarized light beams that could be produced by this embodiment, where the arrows represent the most likely linear polarization in that local area of the beam. The beam then interacts with the sample 102 (FIG. 1). Should the sample 102 be optically active, then each polarization vector in the inhomogeneous polarized beam will rotate by an amount that is dependent on the material distribution in the sample and the geometry of the sample.

Figure 5:
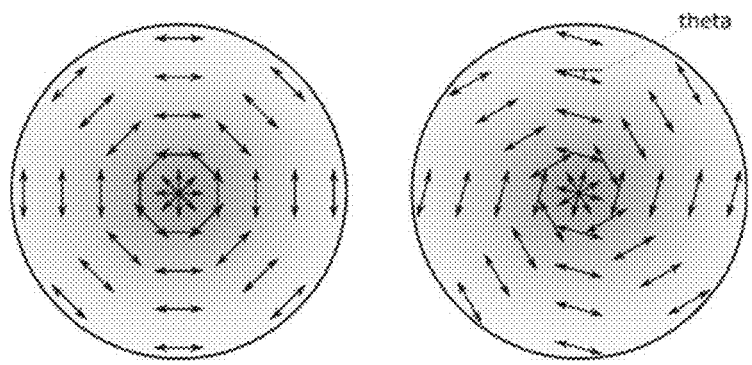
FIG. 5 shows an illustration of the polarization change in an azimuthally polarized beam.

Referring now to FIG. 5, a demonstration of the spatially-inhomogeneously polarized beam is illustrated before and after having passed through a sample. After passing through the second linear polarizer 104 that is oriented at an arbitrary angle relative to the first polarizer, the intensity distribution of the beam is split into many parts. The amount of splitting of parts is dependent upon the order of the continuously heterogeneous half-wave retarder plate vortex waveplate 101. The continuously heterogeneous half-wave retarder plate vortex waveplate 101 can have an order m and the amount of parts the intensity distribution is split into will be 2m. So, for example, if the order of the continuously heterogeneous half-wave retarder plate vortex waveplate was m=1, then the intensity distribution will be bifurcated into two parts. Examples of the intensity distribution are shown in FIG. 6.

Figure 6:
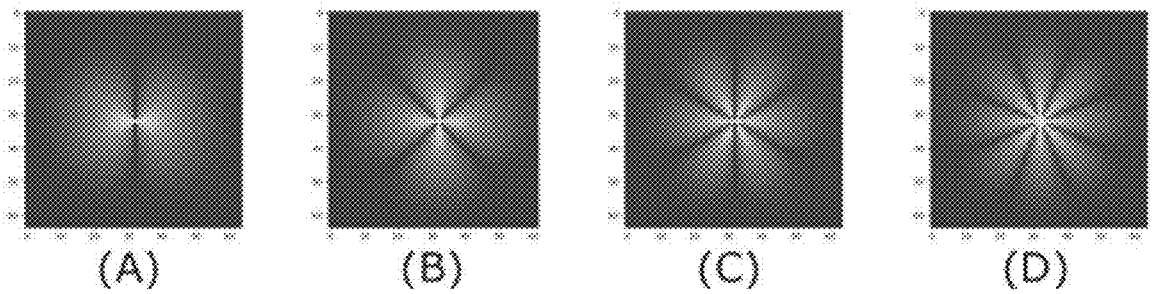
FIG. 6 shows an illustration of beam profiles from multi-order vortex halfwave retarders.

Still referring to FIG. 6, examples of intensity distributions produced by this embodiment are shown. It should be known that the order of the continuously heterogeneous half-wave retarder plate vortex halfwave plate does not change the performance or the intended goals of this embodiment or any of the presented embodiments in this specification.

The bifurcated intensity distribution has two axes of symmetry and as a consequence of the arrangement of the optical components, the axes will rotate about their intersection by an amount proportional to the amount that each polarization vector in the beam has been rotated. Examples of this are shown in FIG. 7 for a m=1 waveplate.

Figure 7:
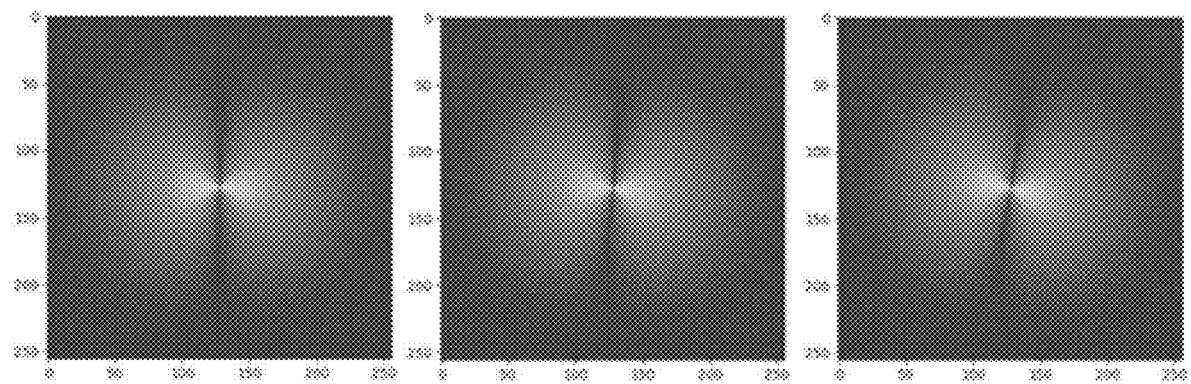
FIG. 7 shows an illustration of measurements received on the detector by various polarization changing samples.

As shown in FIG. 7, rotations of the bifurcated intensity distributions are shown for rotations of 1, 5 and 9 degrees. The purpose of this figure is for demonstration of the concept and does not imply that the angular resolution of this embodiment is limited to 1 or its maximum detectable rotation is 9. This beam is then incident upon a sensor array that samples the beam in two dimensions and converts it into an electrical signal that then passes through a DSP system, 109. This DSP system is used to computationally enhance the intensity distribution by removing any confounding factors and use properties of the optical setup to correct for any imperfection in the system.

Figure 8:
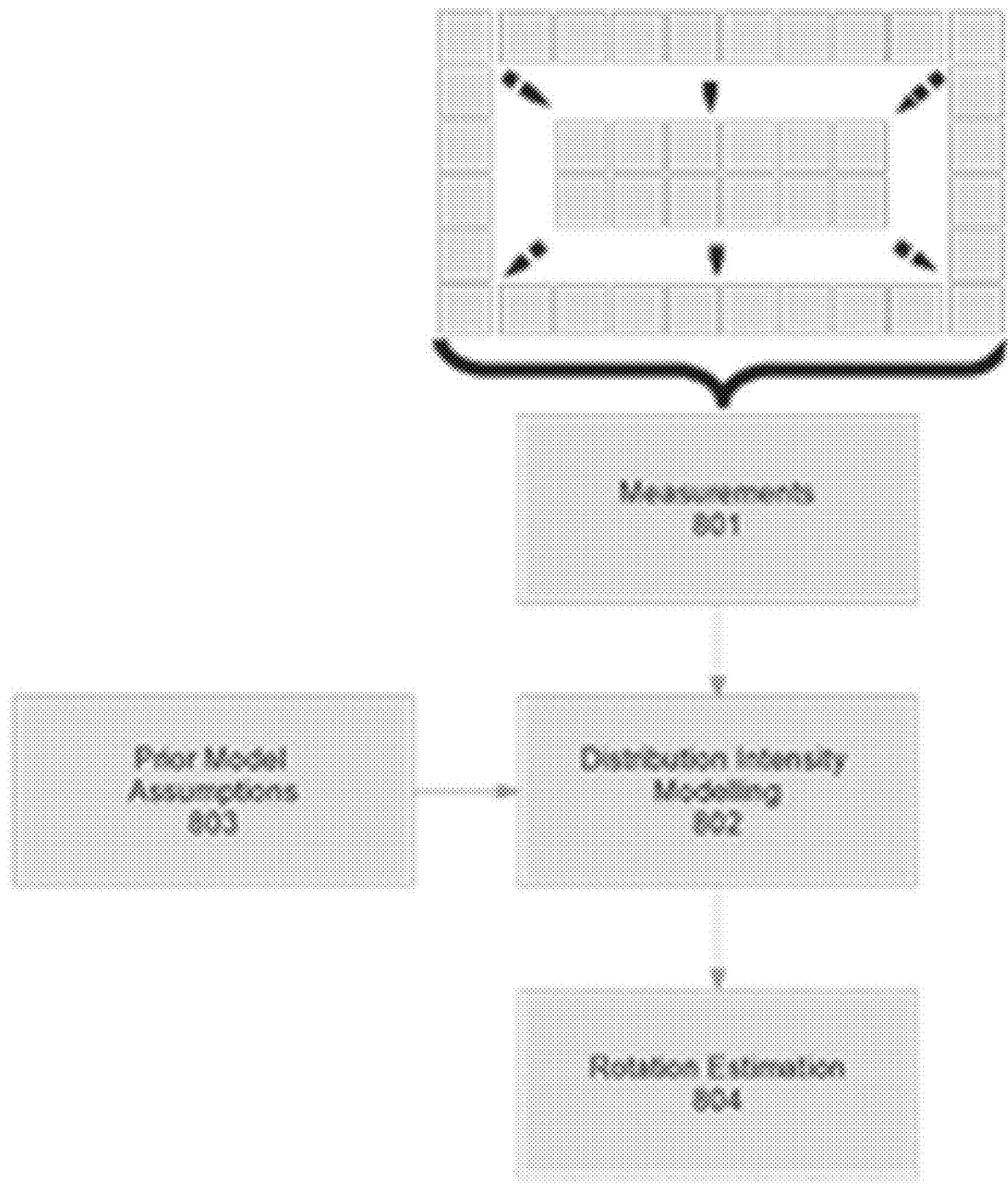
FIG. 8 shows an illustration of the Digital Signal Processing unit's flow of information in accordance with embodiment 1.

Referring now to FIG. 8, an illustrative process performed by the DSP system 109 is shown. The DSP 109 takes all the measurements of the beams intensity distribution and, using prior assumptions of the entire optical system (the base of the optical system, the monochromatic illumination source, 105, and the two-dimensional sensor array, 106), corrects the intensity distribution to account for any confounding factors. The methodology for this correction includes, but is not limited to, probabilistic parametric and non-parametric maximum a posteriori model fitting. After correction, the amount of rotation is determined using a probabilistic comparative model-based method. This rotation is presented in angular units.

Second Embodiment

Figure 9:
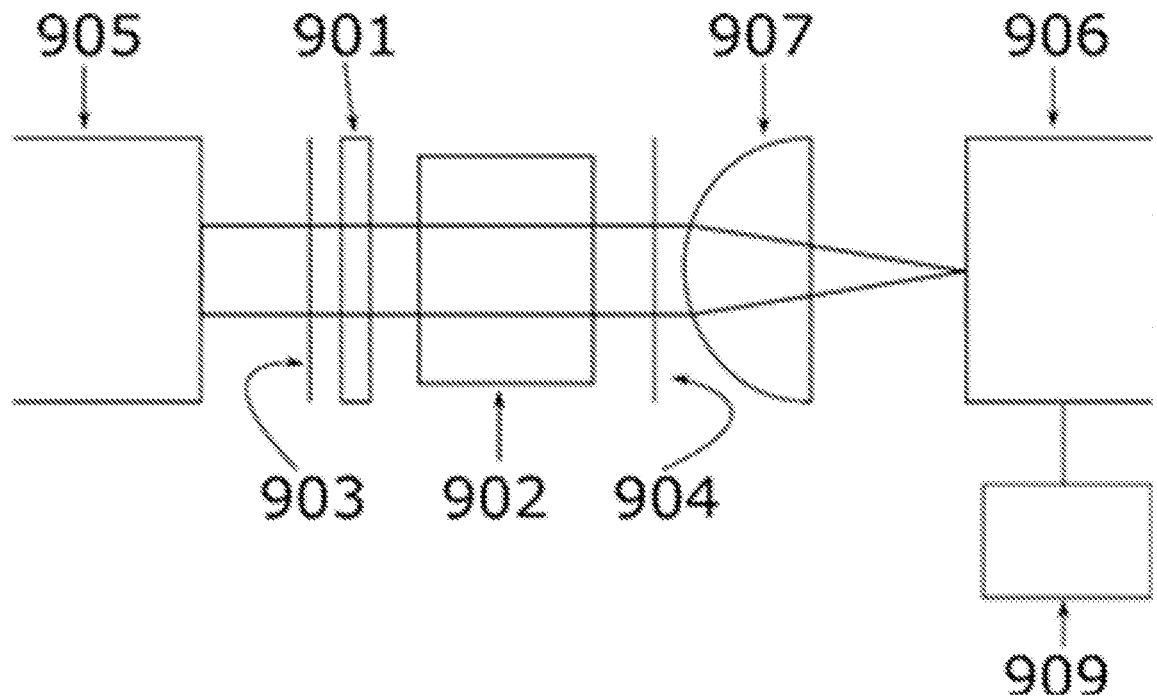
FIG. 9 shows an illustrative system and method for performing light polarization measurement in accordance with embodiment 2.

Now referring to FIG. 9, in a second illustrative embodiment, the system includes a base optical system comprising a continuously heterogeneous half-wave retarder plate 901, sample 902, and two linear polarizers 903 and 904. In addition, the system includes a monochromatic illumination source 905, a two-dimensional sensor array 906, a wavefront manipulation mechanism 907 (including, but not limited to lenses, micro-lens array, and mirrors), and a DSP system 909.

The illustrative system shown produces a beam with an intensity distribution that rotates depending upon the distribution of optically active material in a sample and after optical manipulation becomes incident on the two-dimensional sensor array 906. Properties of the two-dimensional sensor array 906 can have limiting effects on the system's rotation sensitivity.

The distribution of sensors in the sensor array 906 can be in any unique configuration. However, the sensitivity in rotation is limited by $2\delta/M$, where M is the magnification of rotation (i.e., the distance away from the center of rotation or the magnification of the intensity distribution before it encounters the sensor array), and $\delta$ is the pitch of a sensor in the array.

Still referring to FIG. 9, in operation, a collimated beam is produced by the monochromatic illumination source 905 and passed through a first linear polarizer 903. This results in a collimated optical beam with a homogeneous spatial polarization profile. This beam then interacts with the vortex half-wave plate 901 and then becomes a spatially-inhomogeneous polarized beam where the polarization orientation is a function of the azimuthal angle of the beam. The beam then interacts with the sample 902, and the polarization of the beam will as a function of the sample 902's polarizing properties. After leaving the sample 902, the beam passes through a second and final linear polarizer 904, oriented as an arbitrary angle relative to the first polarizer 903. The beam is then passed into wavefront manipulation mechanism 907 before coming in contact with the two-dimensional sensor array 906. A measurement of the beam's intensity profile is then made by the two-dimensional sensor array 906. This measurement is passed into a DSP system 909 where it is processed by a series of image processing methods to determine the polarization of light.

Third Embodiment

Figure 10:
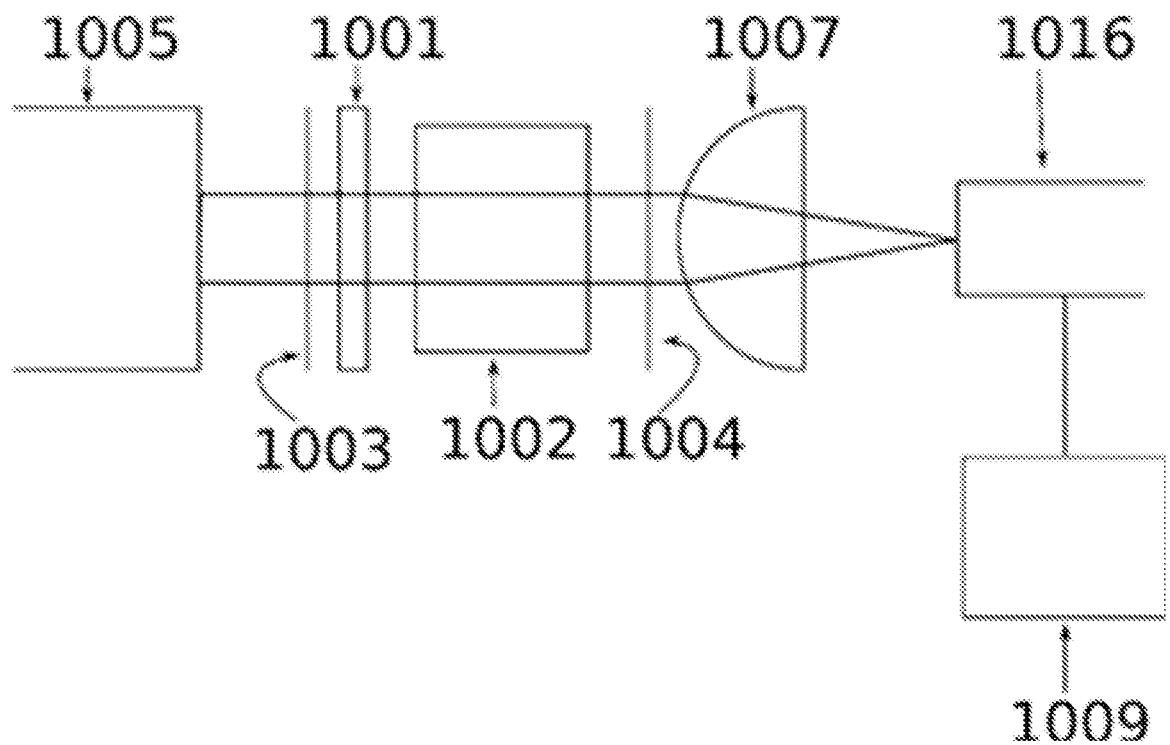
FIG. 10 shows an illustrative system and method for performing light polarization measurement in accordance with embodiment 3.

Now referring to FIG. 10, in a third illustrative embodiment, the system includes a base optical system comprising a continuously heterogeneous half-wave retarder plate 1001, sample 1002, and two linear polarizers 1003 and 1004. In addition, the system includes a monochromatic illumination source 1005, a wavefront manipulation mechanism 1007 (including, but not limited to lenses, micro-lens array, and mirrors), a one-dimensional sensor array 1016, and a DSP system 1009.

In this embodiment, one-dimensional sensor array 1016 may take the place of a two-dimensional sensor array as discussed in the previous embodiment. The one-dimensional array 1016 should be placed away from the center of the intensity distribution, and the center of rotation (thereby increasing M). The larger the distance, the higher the angular sensitivity. This embodiment has the benefit of reducing cost while maintaining system performance.

Figure 11:
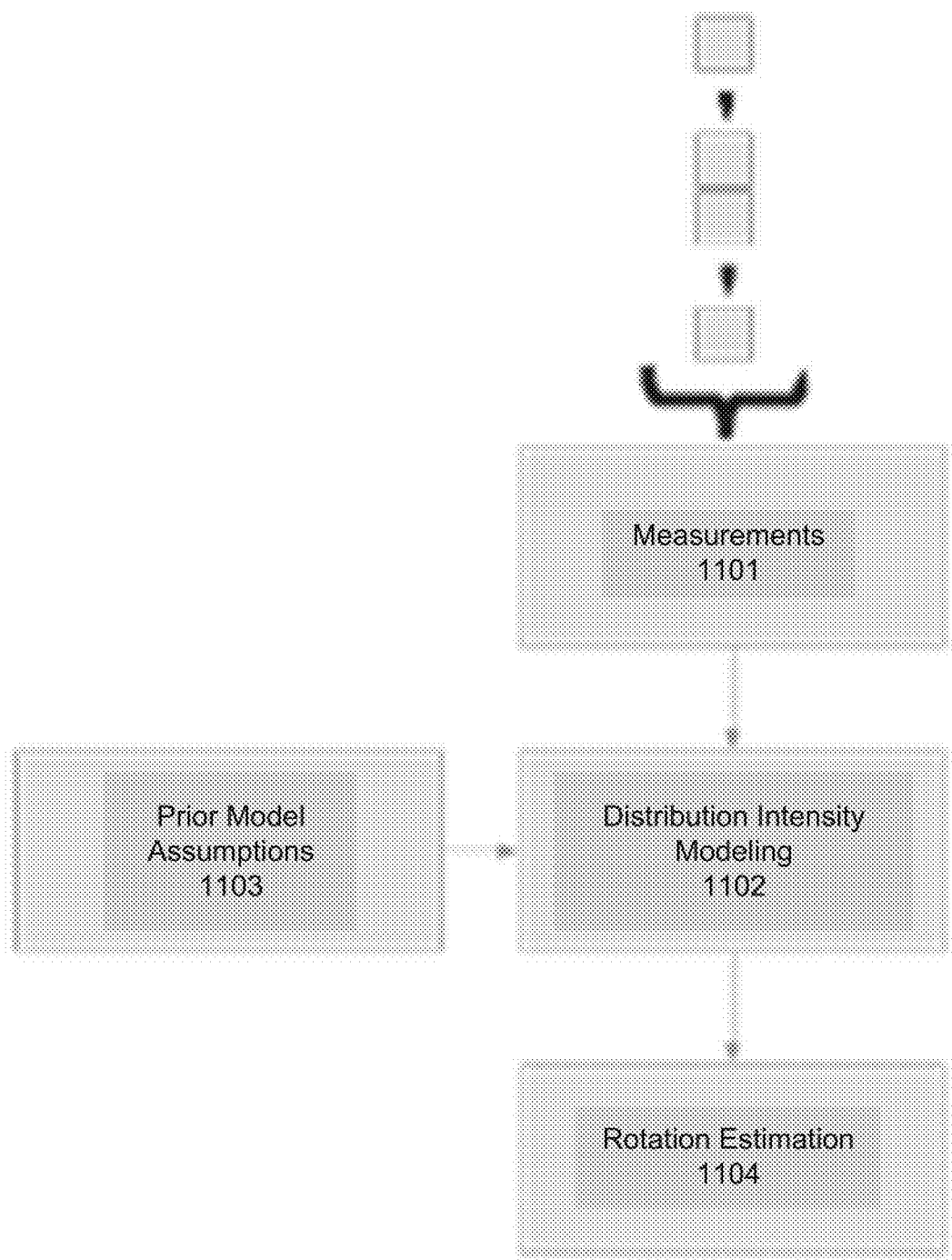
FIG. 11 shows an illustration of the Digital Signal Processing unit's flow of information in accordance with embodiment 3.

The DSP 1009 for this system illustrated in FIG. 10 is different than the DSP of the prior embodiments. FIG. 11 is a representative flow chart for an illustrative DSP 1009. As illustrated in FIG. 11, this embodiment takes the measurements captured on the one-dimensional detector and removes any confounding factor using, but not limited to, a maximum a posteriori probabilistic parametric/non-parametric method using prior assumptions of the entire optical system illustrated in FIG. 10.

Fourth Embodiment

Figure 13:
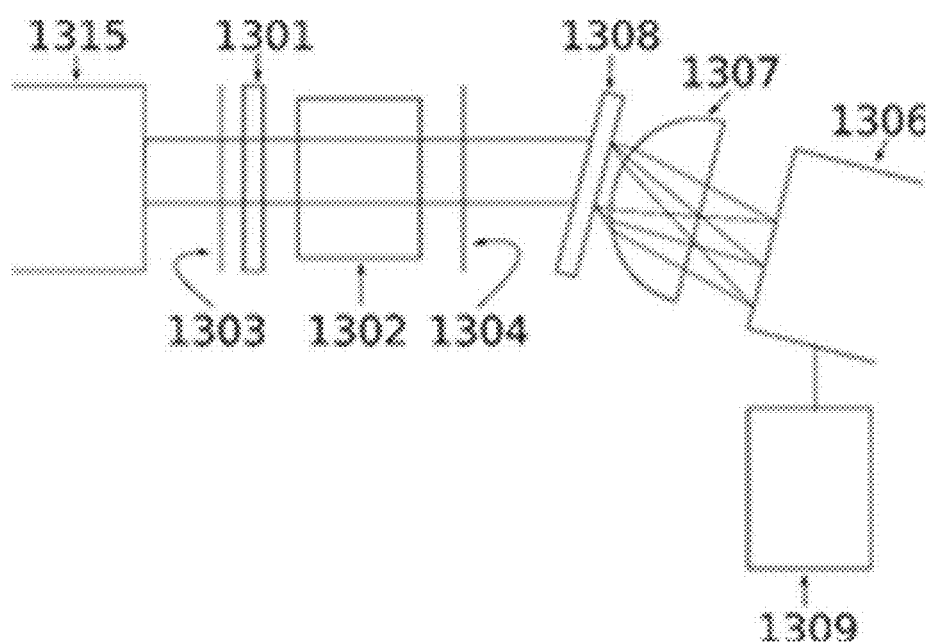
FIG. 13 shows an illustrative system and method for performing light polarization measurement in accordance with embodiment 4.

Now referring to FIG. 13, shown is another embodiment of the presented system and method. In this embodiment, the system includes a base optical system comprising a continuously heterogeneous half-wave retarder plate 1301, sample 1302, and two linear polarizers 1303 and 1304. In addition, the system includes an illumination source 1305, a two-dimensional sensor array 1306, a wavefront manipulation mechanism 1307 (including, but not limited to lenses, micro-lens array, and mirrors), a diffraction grating 1308, and a DSP system 1309.

Some samples 1302 can have a varying optical activities effect depending on the wavelength of illumination that interacts with it. A possible affect is the rotation of light polarization and measuring this activity of the sample 1302 is called measuring the optical rotary dispersion (ORD) of the sample. Another affect is the unequal absorption of circularly polarized referred to as Circular Dichroism (CD). Measuring the circular dichroism of the sample 1302 is called measuring the CD spectrum of the sample.

Figure 12:
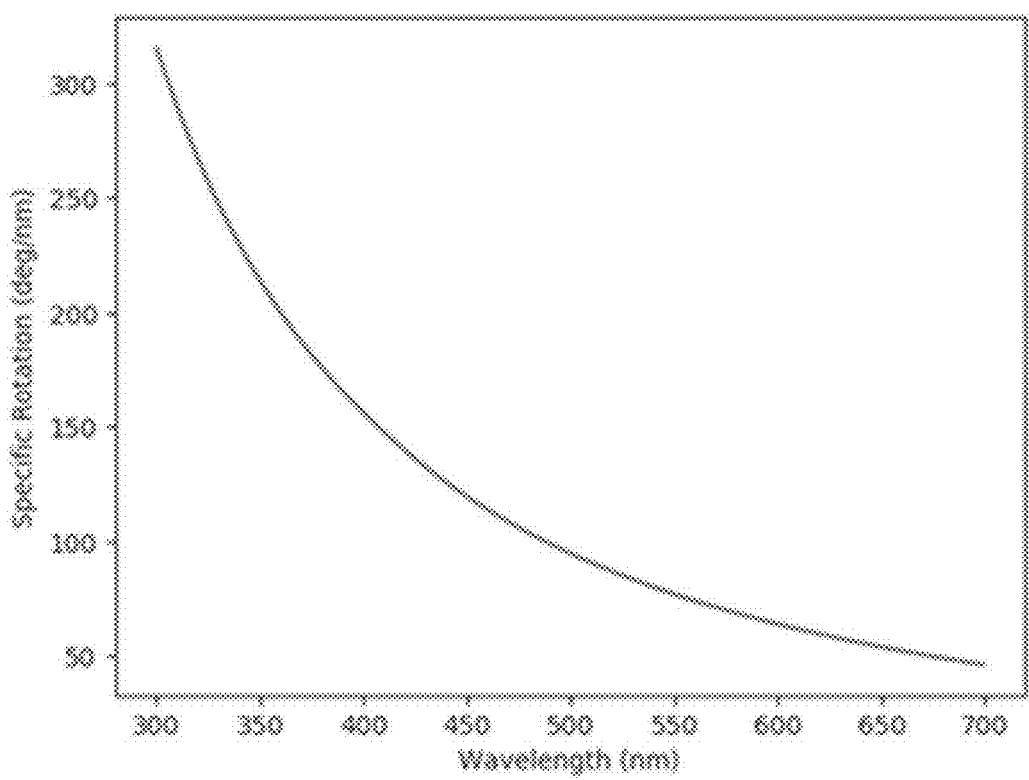
FIG. 12 show a plot of the specific rotary dispersion of D-Glucose.

Referring to FIG. 12, an example ORD is shown for D-Glucose. This curve can be sampled from a mode of this embodiment of the system and method presented. The CD spectra curve can be sampled from another mode of this embodiment.

The illustrative embodiment of FIG. 13 is capable of sampling the ORD of sample 1302 by using a low coherence illumination source or several high-coherence illumination sources with aligned beams 1305, and placing a diffraction grating 1308 and a focusing optic 1307 in between the second and final linear polarizer 1304 and the two-dimensional sensor array 1306. This will disperse copies of the beam's intensity distribution across the two-dimensional sensor array 1306 from longest wavelength to shortest. Each of these copies is rotated by differing amounts since they are produced from different wavelengths, corresponding to the ORD of the sample.

Still referring to FIG. 13, DSP 1309 isolates the copies of the intensity distributions and determine the amount of rotation at each wavelength. DSP 1309 is a multiplexed version of the DSP from the prior embodiments. In addition, however, this embodiment adds an additional DSP component that has different modes depending on the kind of effect being measured.

Figure 14:
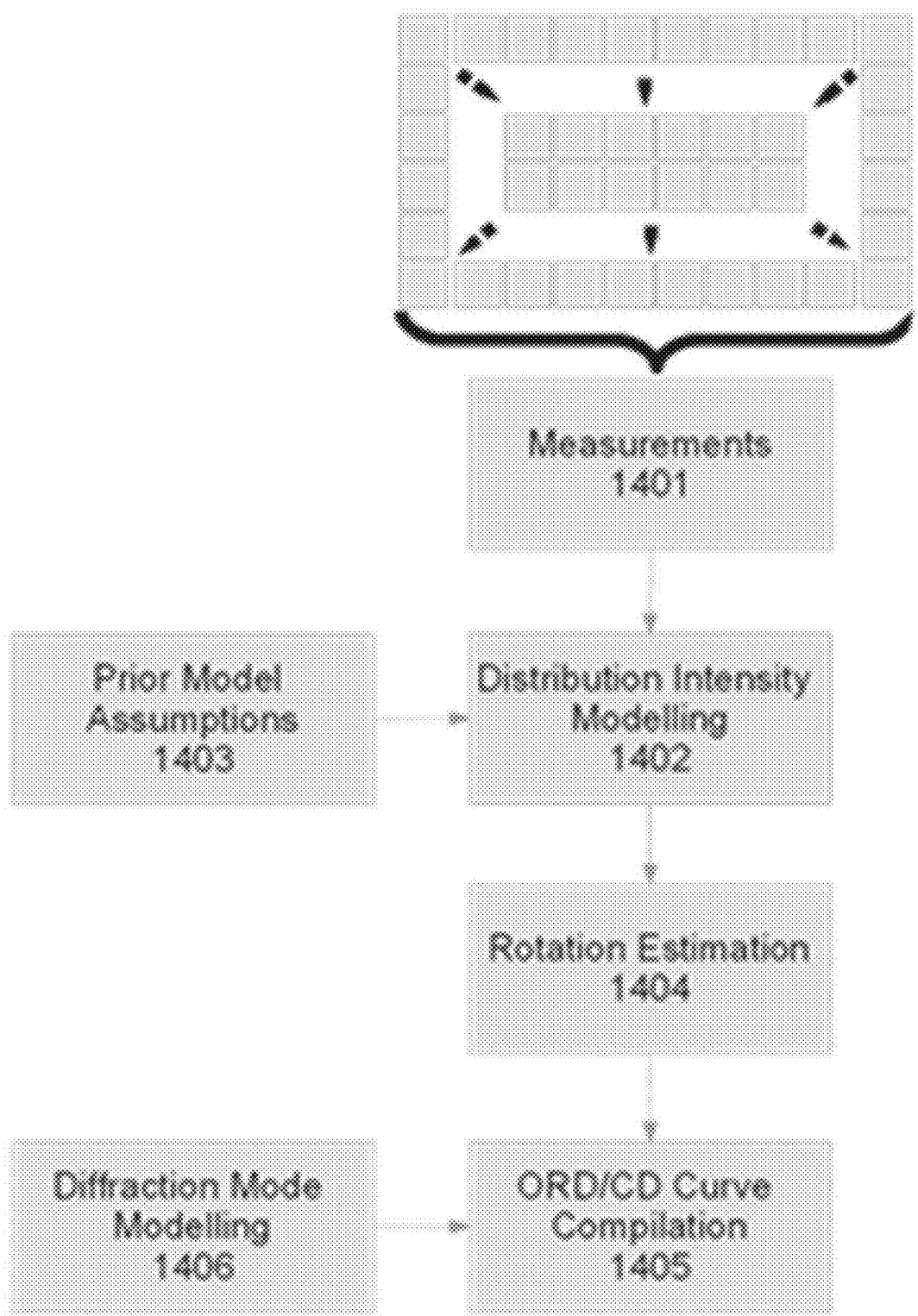
FIG. 14 shows an illustration of the Digital Signal Processing unit's flow of information in accordance with embodiment 4.

Referring to FIG. 14, an illustrative process performed by DSP 1309 for this embodiment is shown. The DSP 1309 takes the measurements from the two-dimensional detector array 1306 and uses distribution intensity modelling to remove any confounding factors from the measurements using prior assumptions of the intensity distributions using methods including, but not limited to, maximum a posteriori probabilistic parametric/non-parametric estimation. For each of the copies of the intensity distributions, parameters are extracted so that the ORD and/or CD value can be estimated. After the angle of rotation and/or CD is estimated for each copy of the intensity distribution, a prior model of the diffraction modes is used to associate each angle with the appropriate wavelength.

Fifth Embodiment

Figure 15:
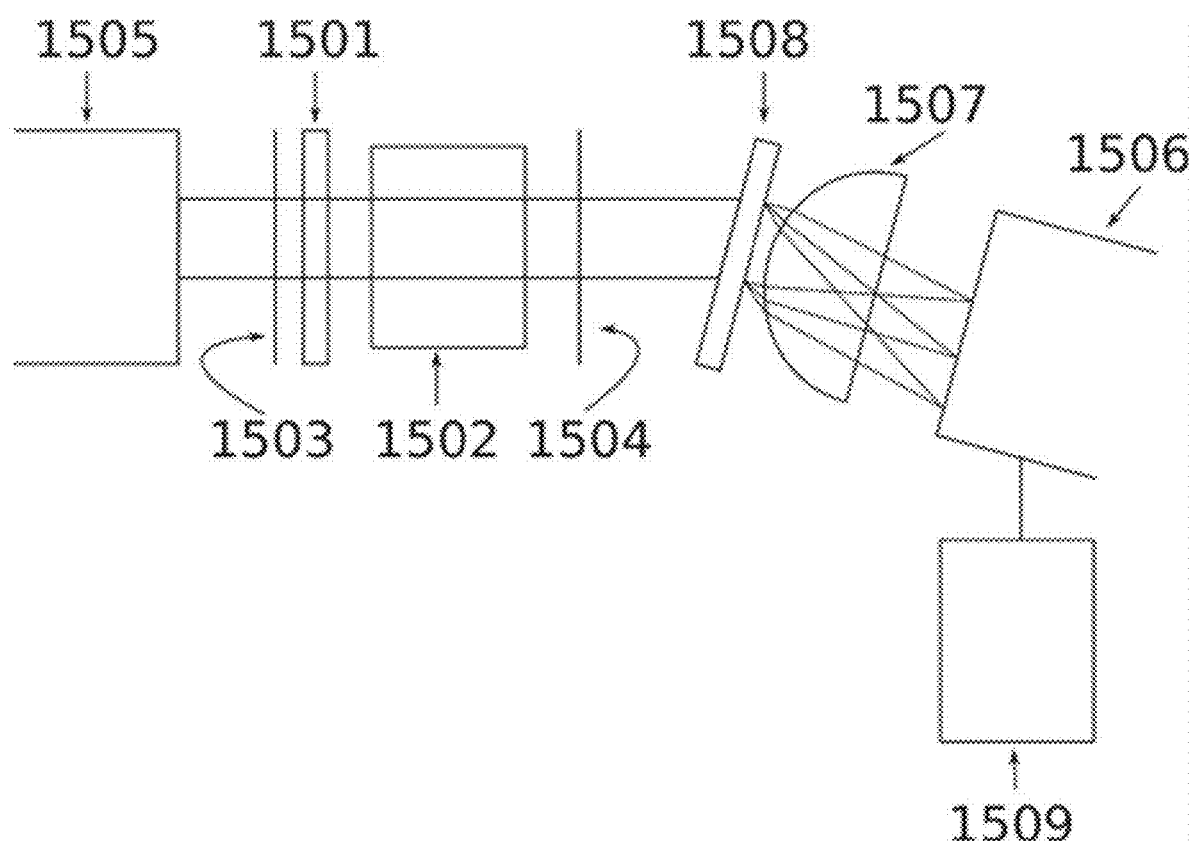
FIG. 15 shows an illustrative system and method for performing light polarization measurement in accordance with embodiment 5.

Now referring to FIG. 15, shown is another illustrative embodiment of the present system and method. In this embodiment, the system includes a base optical system comprising a continuously heterogeneous half-wave retarder plate 1501, sample 1502, and two linear polarizers 1503 and 1504. In addition, the system includes an illumination source 1505, a two-dimensional sensor array 1506, a wavefront manipulation mechanism 1507 (including, but not limited to lenses, micro-lens array, and mirrors), a low-efficiency transmission diffraction grating (i.e., grating with small groove density) 1508, and a DSP system 1509.

In operation, a collimated beam is produced by the illumination source 1505 and passed through a first linear polarizer 1503. This results in a collimated optical beam with a homogeneous spatial polarization profile. This beam then interacts with the vortex half-wave plate 1501 and then becomes a spatially-inhomogeneous polarized beam where the polarization orientation is a function of the azimuthal angle of the beam. The beam then interacts with the sample 1502 and the polarization of the beam will change as a function of the sample's polarizing properties. After leaving the sample, the beam passes through second and final linear polarizer 1504 which is oriented as an arbitrary angle relative to the first polarizer 1503. The beam is then dispersed using a diffraction grating 1508. The dispersed beam is focused onto the two-dimensional sensor array 1506 using a wavefront manipulation mechanism 1507 (including, but not limited to lenses, micro-lens array, and mirrors). A measurement of the beam's intensity is made by the two-dimensional sensor array 1506. This measurement is passed into DSP system 1509 where it is processed by a series of image processing methods to determine the polarization of light.

Figure 16:
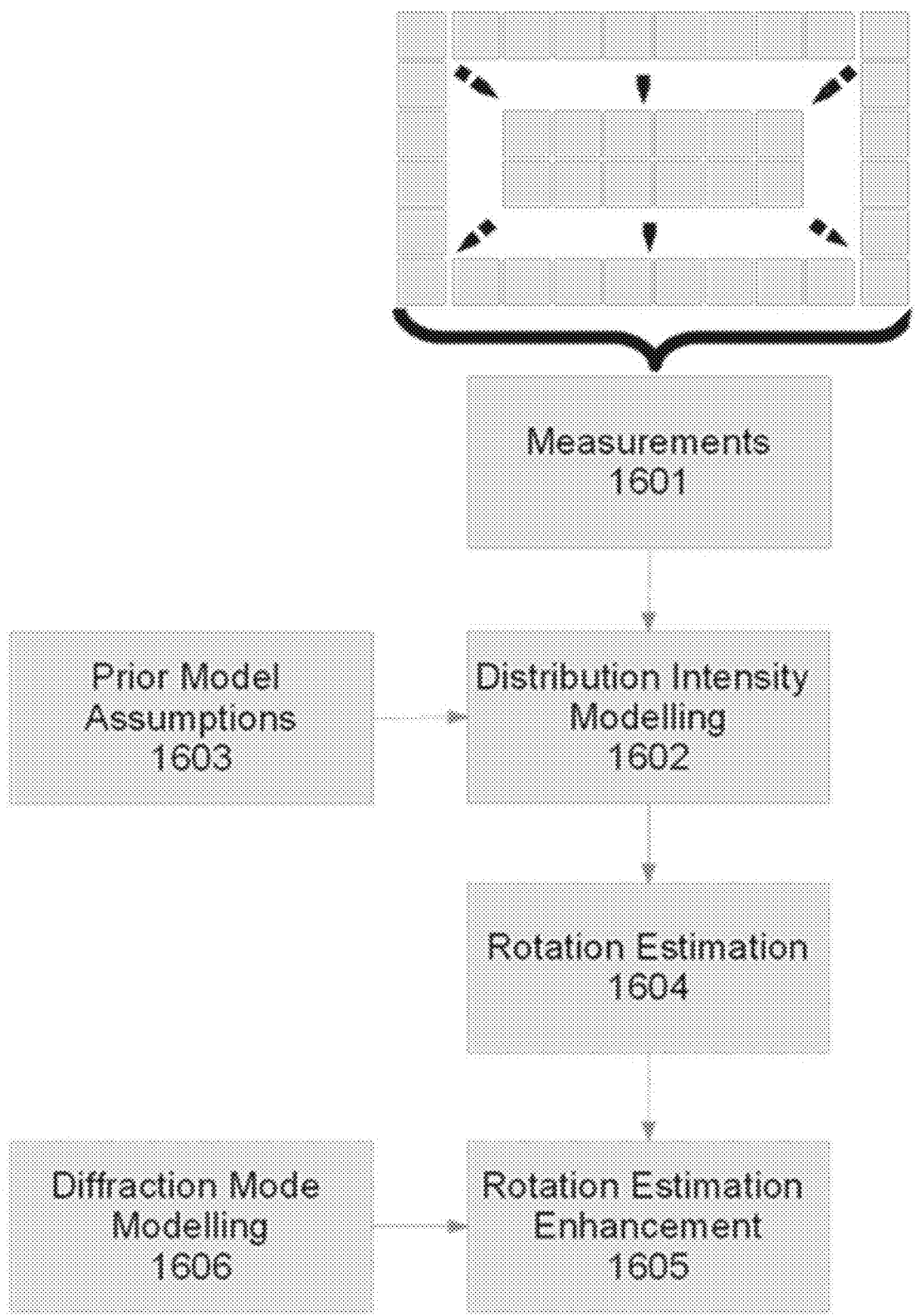
FIG. 16 shows an illustration of the Digital Signal Processing unit's flow of information in accordance with embodiment 5.

The DSP system in this embodiment is similar to the one illustrated in FIG. 16 as it enhances the measurement of the intensity distribution curves through prior knowledge of the system to corrects for is low SNR. However, the more measurements this can be captured, the higher the likelihood of getting more accurate results for the ORD and/or CD.

This embodiment shown in FIG. 15 can increase the number of measurements by using a low-efficiency diffraction grating in a system with a single highly coherent illumination source plus a focusing optic. While the components in this embodiment are arranged similarly to the previous embodiment, the diffraction grating 1408 is of lower efficiency, so the diffractions modes can fit onto the spatial detector array for a particular wavelength of the highly coherent source. These copies are all rotated by the same amount since they are all produced from a monochromatic illumination source and are combined in a new DSP to better estimate properties of the polarizing material's distribution.

Sixth Embodiment

Figure 17:
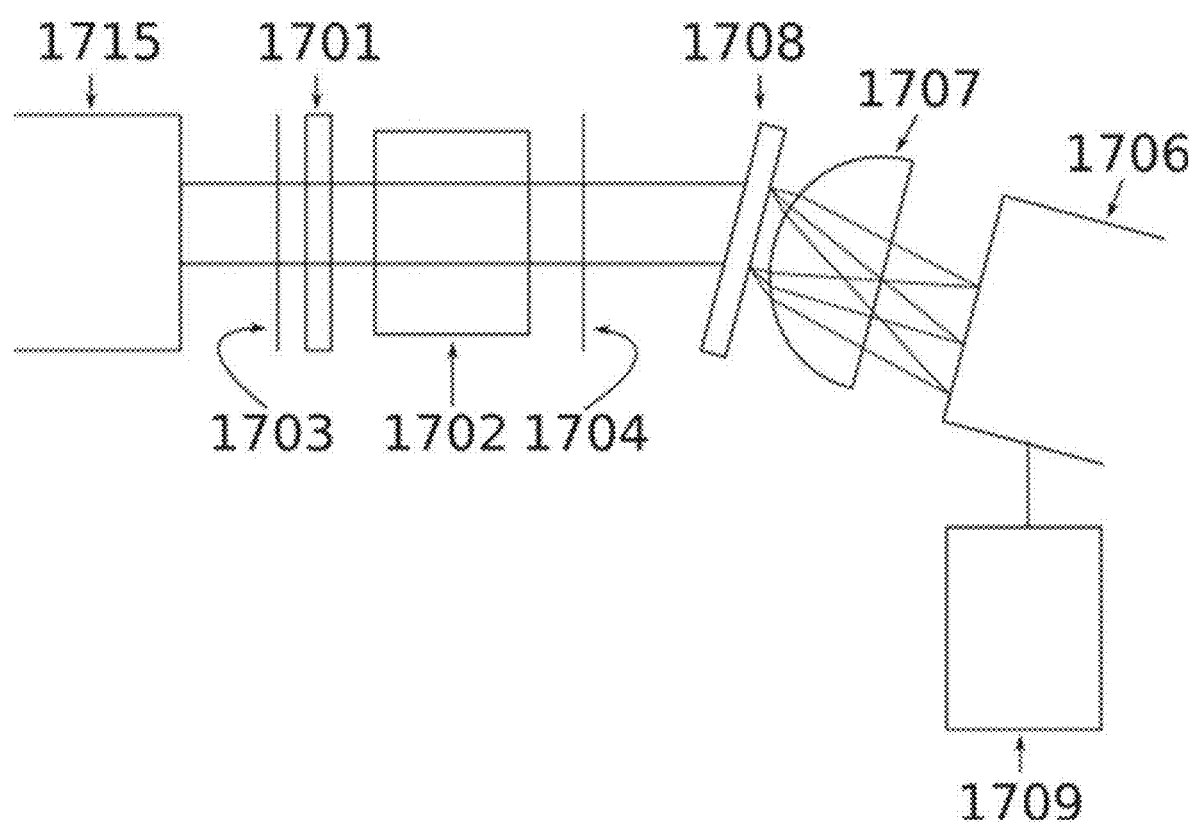
FIG. 17 shows an illustrative system and method for performing light polarization measurement in accordance with embodiment 6.

Referring to FIG. 17, shown is another embodiment of the presented system and method. In this embodiment, the system includes a base optical system comprising a continuously heterogeneous half-wave retarder plate 1701, a sample 1702 (e.g. a solution of a drug sample with a target molecule), and two linear polarizers 1703 and 1704. In addition, the system includes a series of monochromatic illumination sources or a broadband illumination sources 1715, a diffraction grating 1708, a wavefront manipulation mechanism 1707, and a two-dimensional sensor array 1706.

In operation, the series of monochromatic illumination sources or broadband illumination sources 1715 pass through a first linear polarizer 1703 to attain a spatially homogeneous initial polarization before entering the vortex halfwave retarder 1701. The retarder 1701 produces a beam with a spatially non-homogeneous polarization. That beam will now encounter the target molecule of the drug sample 1702. The interaction with the target molecule of the drug sample 1702 will cause there to be a rotation and absorption to occur of all the local linear polarization vectors in the beam. The amount of rotation and absorption is related to the structural form of the molecules and is different for each wavelength. Since the binding of molecules is a non-linear reaction, it cannot be assumed that the ORD/CD curves of two molecules, when mixed into a solution, will be the sum of the ORDs/CDs of the individual molecules. As a result of this non-linearity, we can estimate the binding constant of molecules in the sample.

After the local polarization vectors have been rotated and absorbed, the beam passes through a second linear polarizer 1704. This will cause the beam to have a bifurcated intensity profile. This intensity produced is rotated proportionally by the amount that the local polarization vectors are rotated for each wavelength. In addition, the distribution of the intensity changes based on the absorption. The beam then encounters the diffraction grating 1708, and is dispersed according to the wavelength. Each wavelength shows an intensity profile rotated by the specific rotation and absorbed by the specific dichroism of the molecule for a particular wavelength. A focusing optic 1707 is then used to direct the beam towards the two-dimensional sensor array. Measurement from the array are passed into a DSP system 1709, to then reconstruct the ORD and CD curve of the sample solution 1702. The ORD and CD curve is passed further into DSP to determine the binding constant of the molecules in the solution, given prior knowledge of the ORD's and CD's for each of the molecules.

Figure 18:
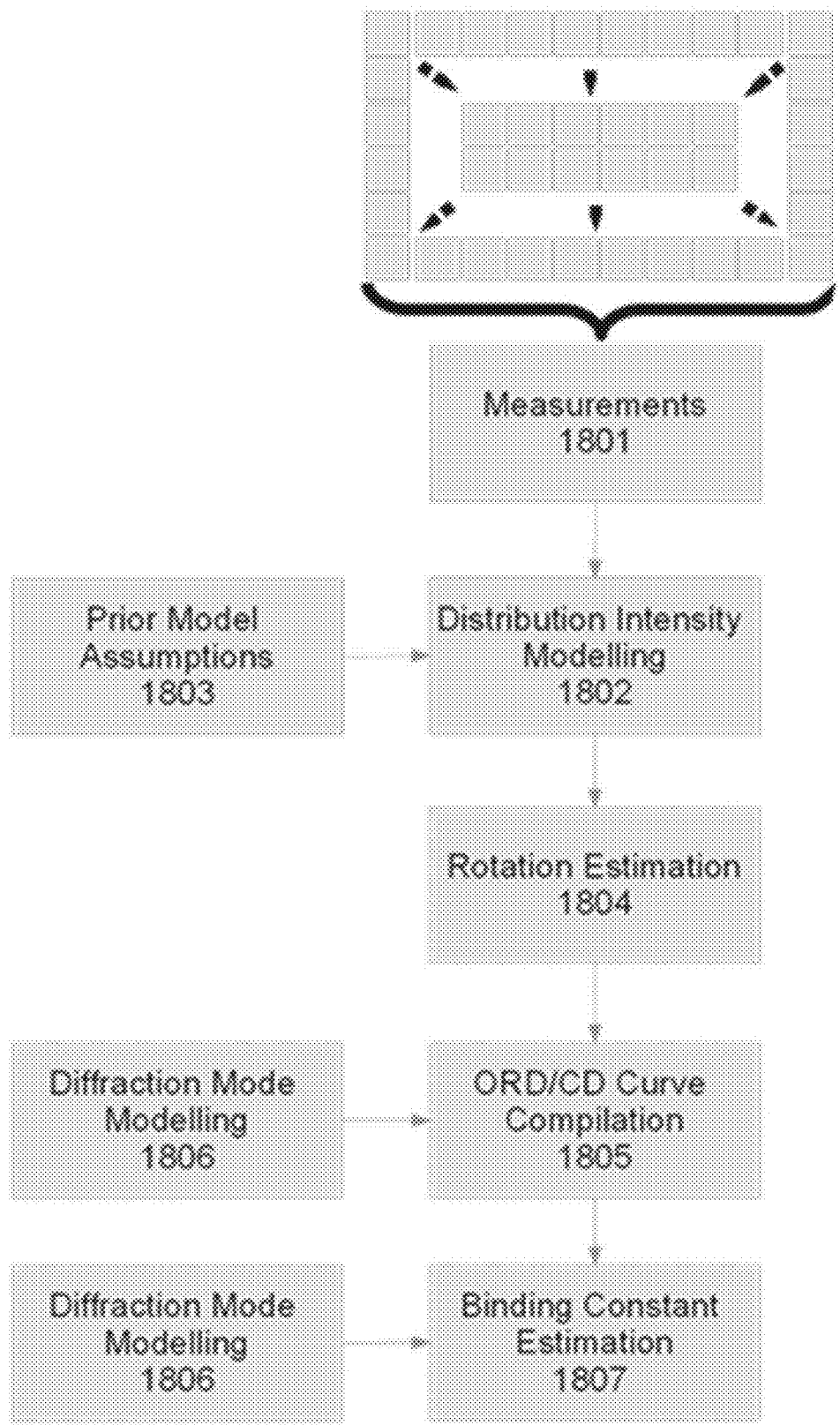
FIG. 18 shows an illustration of the Digital Signal Processing unit's flow of information in accordance with embodiment 6.

Referring to FIG. 18, shown is an illustrative process executed by DSP 1709 for this embodiment. The DSP 1709 takes the measurements from the two-dimensional detector array and uses distribution intensity modelling to remove any confounding factors from the measurements using prior assumptions of the intensity distributions using methods including, but not limited to, maximum a posteriori probabilistic parametric/non-parametric estimation.

For each of the copies of the intensity distributions, parameters are extracted so that the ORD and/or CD value can be estimated. After the angle of rotation and/or CD is estimated for each copy of the intensity distribution, a prior model of the diffraction modes is used to associate each angle with the appropriate wavelength.

From this ORD and CD, we can estimate the binding constant for the solution sample 1702 (e.g. a drug sample with a target molecule).

Seventh Embodiment

Figure 19:
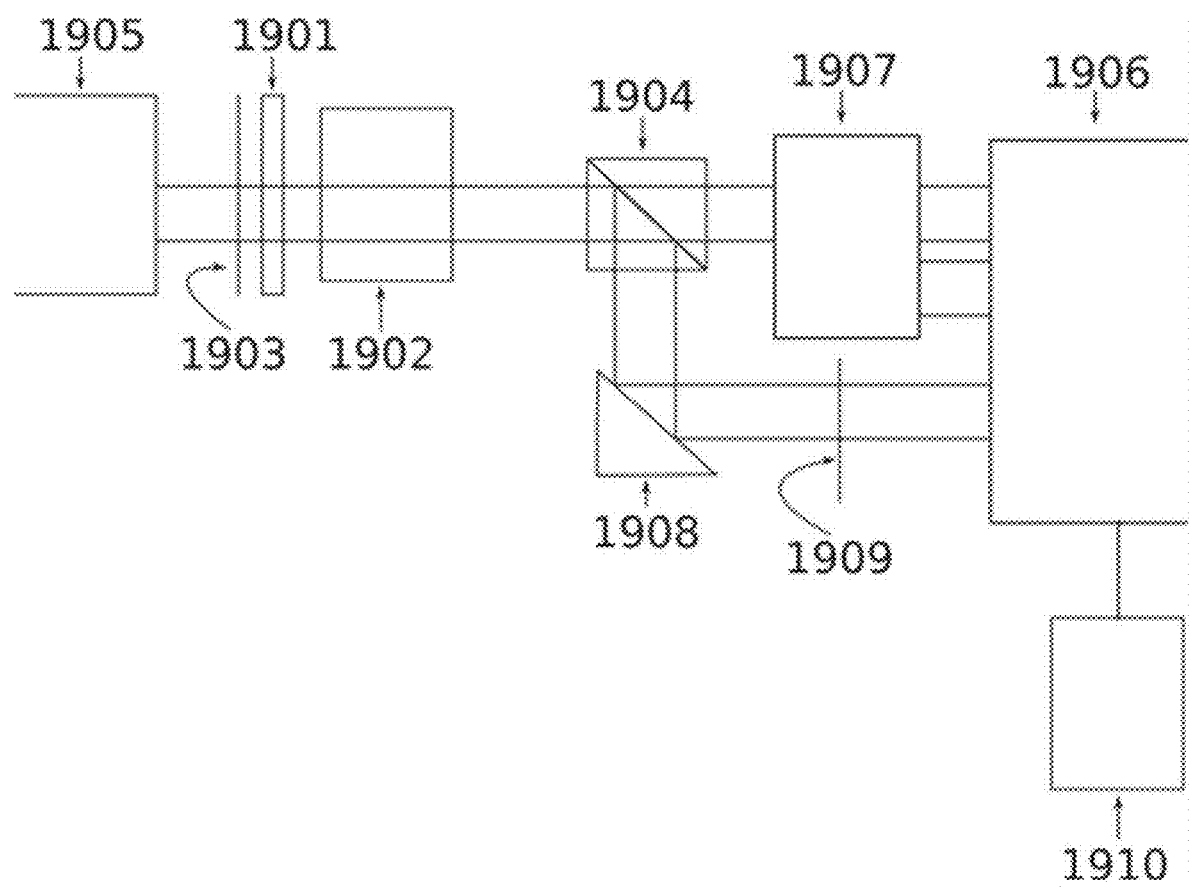
FIG. 19 shows an illustrative system and method for performing light polarization measurement in accordance with embodiment 7.

Now referring to FIG. 19, shown is another embodiment of the presented system and method. The system includes a base optical system comprising a continuously heterogeneous half-wave retarder plate 1901, a sample 1902, and a first linear polarizer 1903.

In addition, the system includes a monochromatic illumination source 1905, a linear polarizer 1903, an optic 1904 that splits the beam by power, a birefringent crystal 1907 that causes a lateral displacement between two orthogonal linear polarization states, a reflecting surface 1908, a circular polarizer 1909, a two-dimensional sensor array 1906, and a DSP system 1910.

In operation, illumination from the monochromatic illumination source 1905 will pass through the optical system as described for other earlier embodiments, except that rather than passing through a second and final linear polarizer after the sample, the beam will be split by optic 1904 based on a power ratio in two different directions. These split beams are referred to as Beam 1 and Beam 2. Beam 1 will then interact with a birefringent crystal 1907 that converts Beam 1 into two beams with orthogonal polarizations relative to each other. These two beams will continue to the detector and be measured by the two-dimensional detector array 1906. Beam 2 will be reflected off a surface 1908 and then passed through a circular polarizer 1909. This circular polarizer 1909 will change the intensity of the beam and include an intensity change due to the phase difference between the orthogonal light beams from Beam 1. After Beam 2 has left the circular polarizer 1909, it will encounter a different part of the two-dimensional sensor array 1906. The measurements from the two-dimensional sensor array 1906 of Beam 1 and Beam 2 are simultaneously passed into a DSP system 1910 where the ellipitsity of the beam is then estimated.

Figure 20:
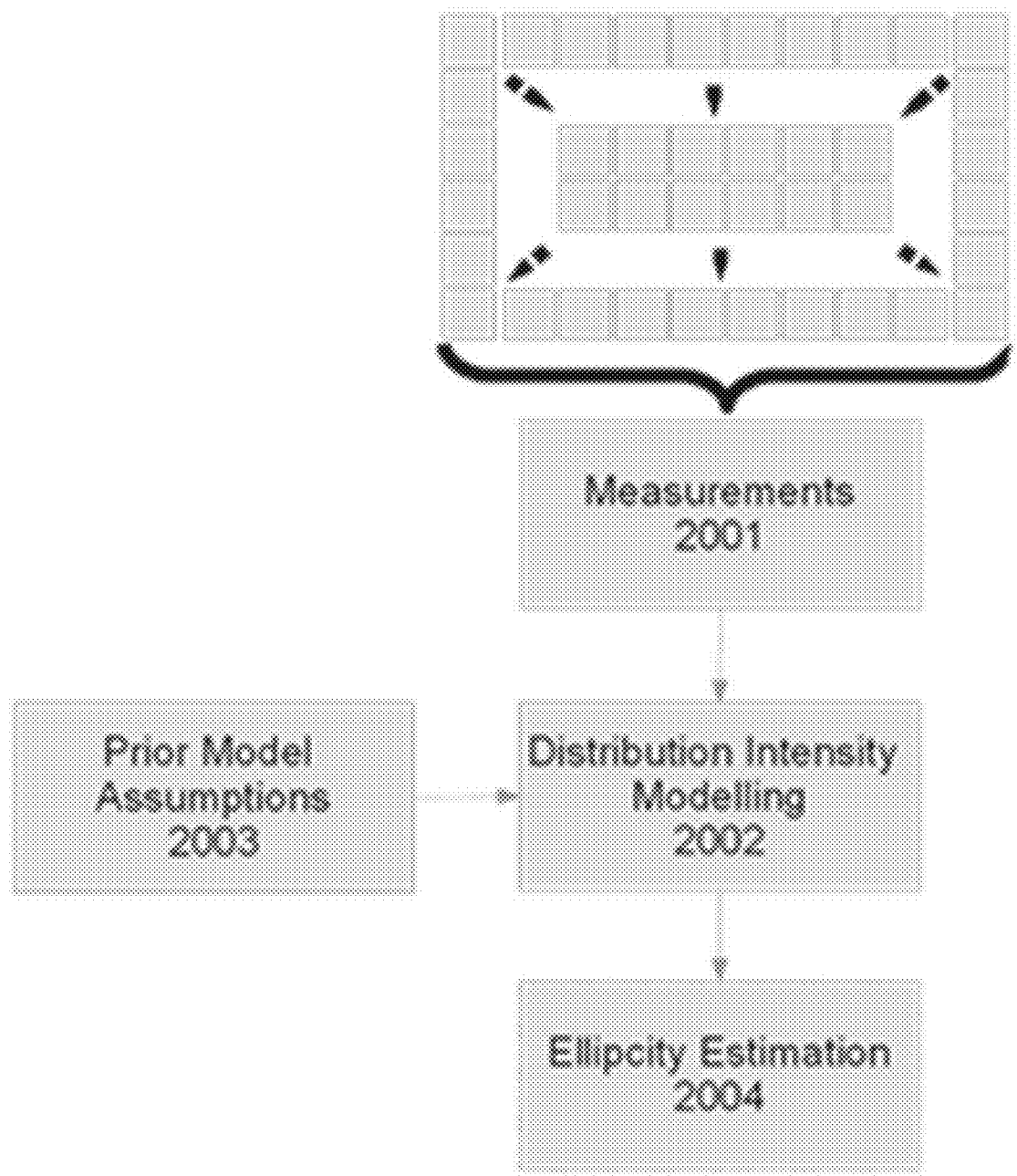
FIG. 20 shows an illustration of the Digital Signal Processing unit's flow of information in accordance with embodiment 7.

Referring to FIG. 20, and illustrative process performed by DSP 1910 for this embodiment is shown. The DSP 1910 takes the measurements from the two-dimensional detector array 1906 and uses distribution intensity modelling to remove any confounding factors from the measurements using prior assumptions of the intensity distributions using methods including, but not limited to, maximum a posteriori probabilistic parametric/non-parametric estimation. Once the confounding factors have been removed, using theoretical models, the measurements of Beam 1 and Beam 2 are combined to estimate the phase delay between the linear orthogonal polarization and from there used to estimate the ellipisity of the beam that left the sample.

Eighth Embodiment

Figure 21:
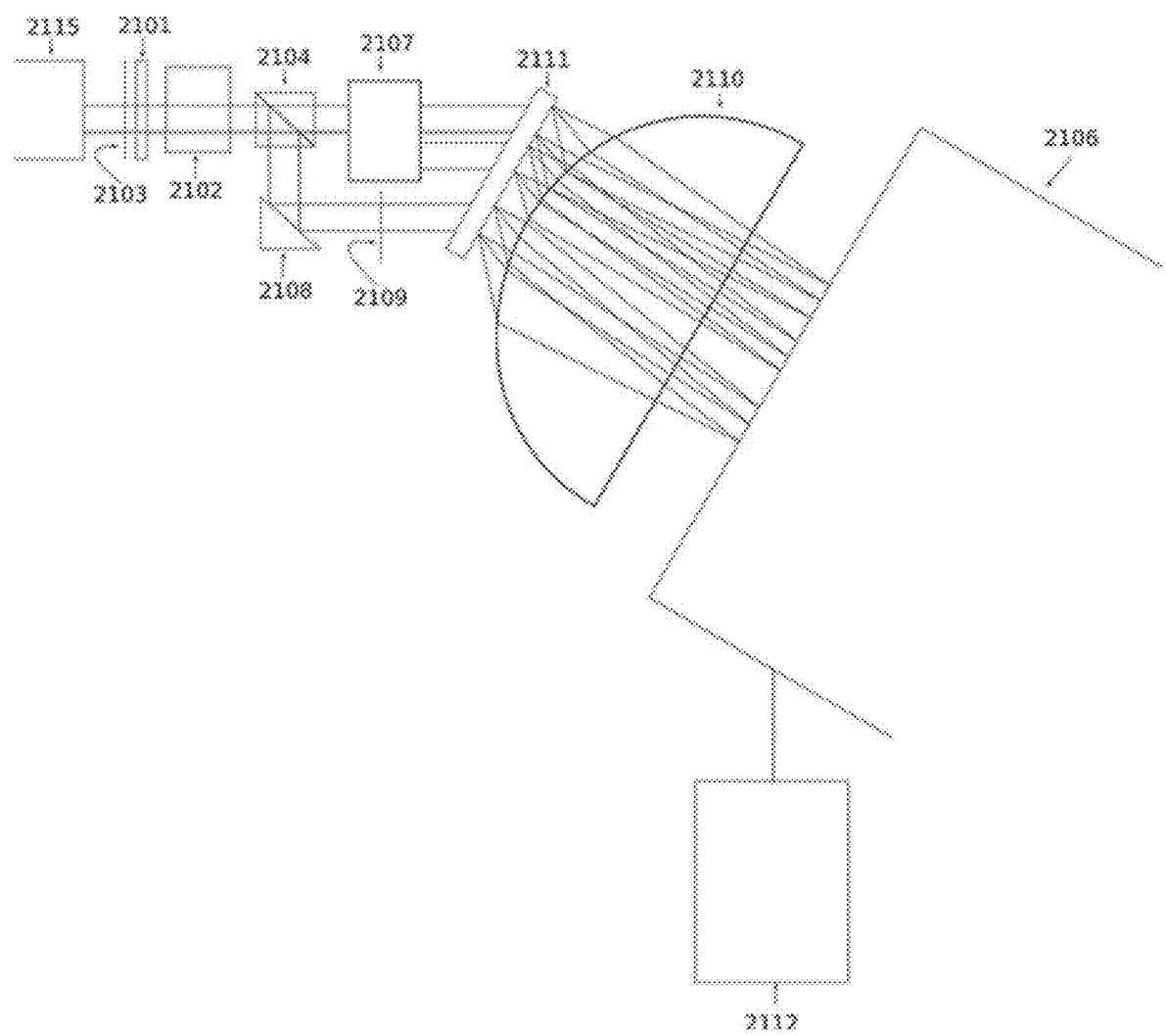
FIG. 21 shows an illustrative system and method for performing light polarization measurement in accordance with embodiment 8.

Now referring to FIG. 21, shown is another embodiment of the presented system and method. In this embodiment, the system includes a series of monochromatic illumination sources or a broadband illumination sources 2115, a linear polarizer 2103, a half-wave vortex retarder waveplate 2101, a sample 2102, an optic 2104 that splits the beam by power, a birefringent crystal 2107 that causes a lateral displacement between two orthogonal lineal polarization states, a reflecting surface 2108, a circular polarizer 2109, a diffraction grating 2111, a focusing optic 2110, a two-dimensional sensor array 2106, and a DSP system 2112.

In operation, illumination from the series of monochromatic illumination sources or a broadband illumination source 2115 will pass through the optical system as earlier described, except that rather than passing through a second and final linear polarizer after the sample 2102, the illumination will be split by optic 2104 based on a power ratio in two different directions. These are referred to as Beam 1 and Beam 2. Beam 1 will then interact with birefringent crystal 2107 that converts Beam 1 into two beams with orthogonal polarizations, relative to each other. Beam 2 will be reflected off a surface 2108 and then passed through circular polarizer 2109. This polarizer 2109 will change the intensity of the beam and include an intensity change due to the phase difference between the orthogonal light beams from Beam 1. Beam 1 and Beam 2 will then be dispersed through a diffraction grating 2111 and focused by focusing optic 2110 onto the two-dimensional detector array 2106 resulting in three rows of intensities. The measurements of the three rows are passed into a DSP 2112 and the CD curve is produced.

Figure 22:
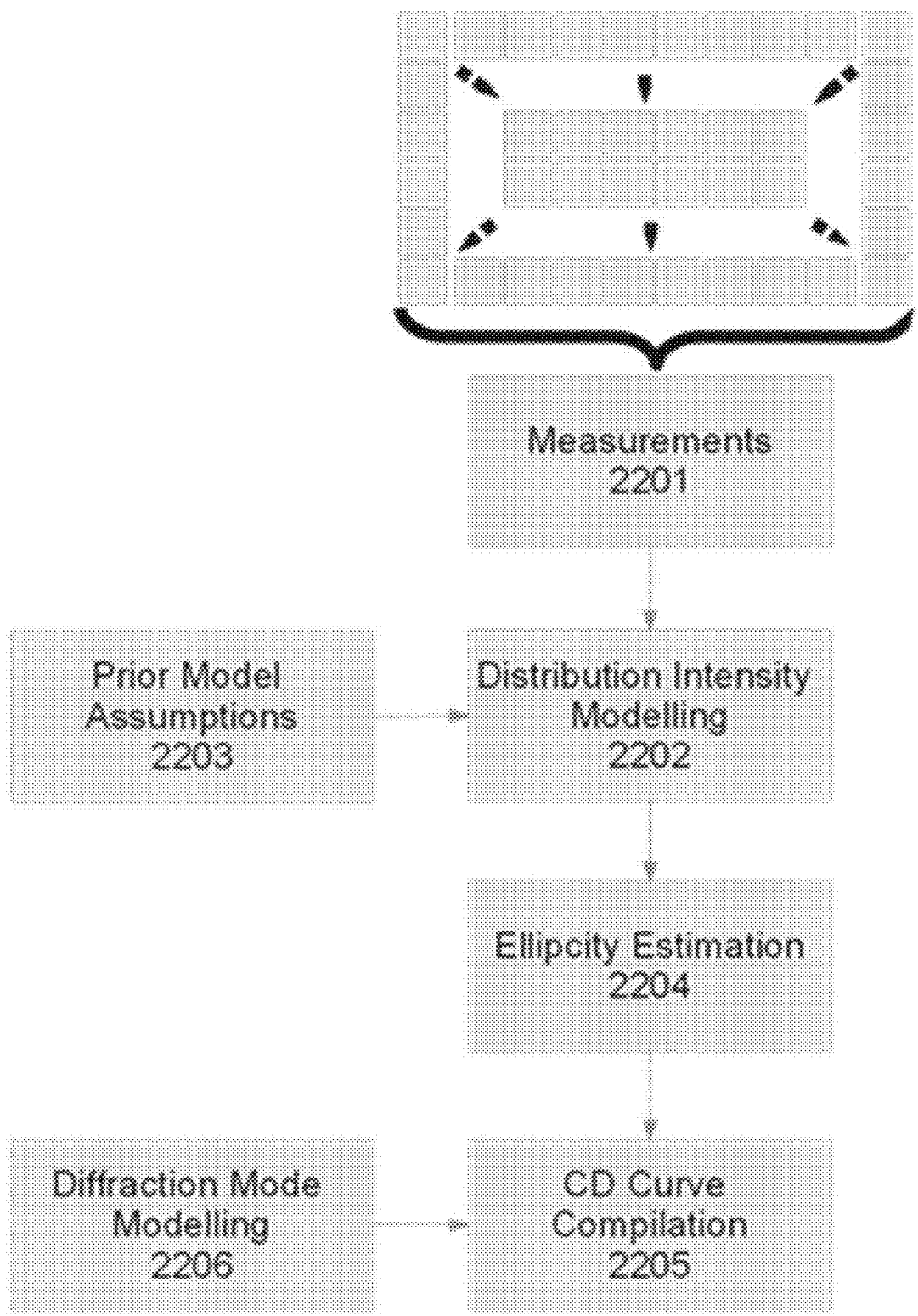
FIG. 22 shows an illustration of the Digital Signal Processing unit's flow of information in accordance with embodiment 8.

Referring to FIG. 22, shown is an illustrative process performed by DSP 2112 for this embodiment. The DSP 2112 takes the measurements from the two-dimensional detector array 2106 and uses distribution intensity modelling to remove any confounding factors from the measurements using prior assumptions of the intensity distributions using methods including, but not limited to, maximum a posteriori probabilistic parametric/non-parametric estimation. Once the confounding factors have been removed, using theoretical models, the measurements of Beam 1 and Beam 2 are combined to estimate the phase delay between the linear orthogonal polarization and from there used to estimate the ellipticity of the beam that left the sample for each wavelength. From this, the CD curve can be produced.

Ninth Embodiment

Figure 23:
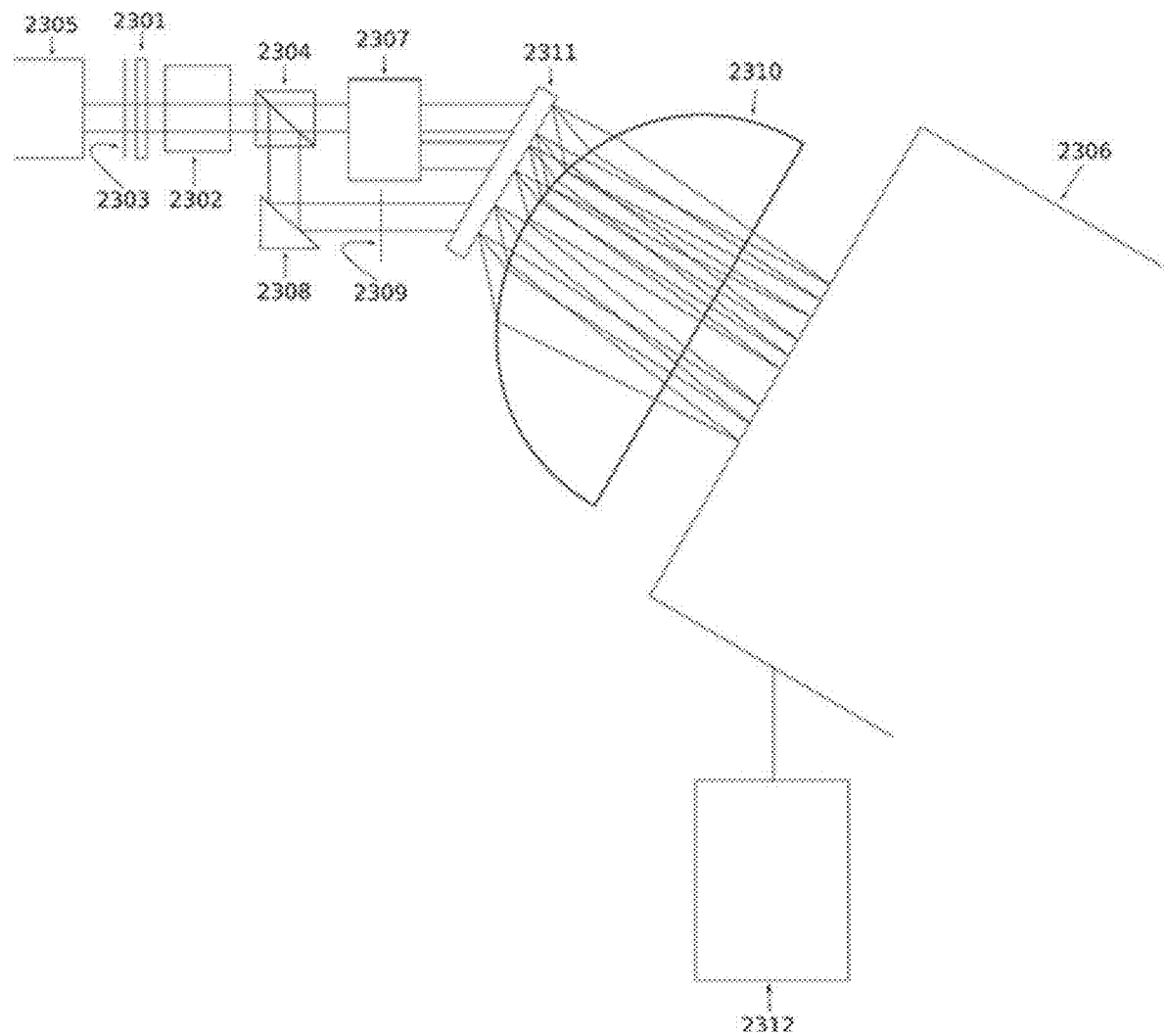
FIG. 23 shows an illustrative system and method for performing light polarization measurement in accordance with embodiment 9.

Now referring to FIG. 23, shown is another embodiment of the presented system and method. In this embodiment, the system includes a monochromatic illumination source or tunable broadband source 2305, a linear polarizer 2303, a half-wave vortex retarder waveplate 2301, a sample 2302, an optic 2304 that splits the beam by power, a birefringent crystal 2307 that causes a lateral displacement between two orthogonal lineal polarization states, a reflecting surface 2308, a circular polarizer 2309, a low-efficiency transmission diffraction grating (i.e., grating with small groove density), a focusing optic 2310, and a two-dimensional sensor array 2306.

In operation, illumination from a monochromatic illumination source or a tunable broadband illumination source 2305 will pass through the optical system as earlier described, except that rather than passing through a second and final linear polarizer after the sample 2301, the beam will be split by optic 2304 based on a power ratio in two different directions. These are referred to as Beam 1 and Beam 2. Beam 1 will then interact with a birefringent crystal 2307 that converts Beam 1 into two beams with orthogonal polarizations, relative to each other. Beam 2 will be reflected off surface 2308 and then passed through circular polarizer 2309. This polarizer 2309 will change the intensity of the beam due to the phase difference between the orthogonal light beams from Beam 1. Beam 1 and Beam 2 will then be dispersed through diffraction grating 2311. This diffraction grating 2311 is of low-efficiency and will therefore disperse multiple diffraction modes within a very small angular arc. Within this angular arc, the intensity distributions of Beam 1 and 2 will be seen once in each of the modes, so when the dispersed beams reach the two-dimensional sensor arrays 2306, three rows will be seen and each of the items in those rows will be copies of the same intensity distribution. Measurements from the two-dimensional sensor array 2306 are then passed into the DSP 2312 where combines the copies to increase the SNR of the measurements to produce accurate ellipticity measurements and also to produce accurate CD curves.

Figure 24:
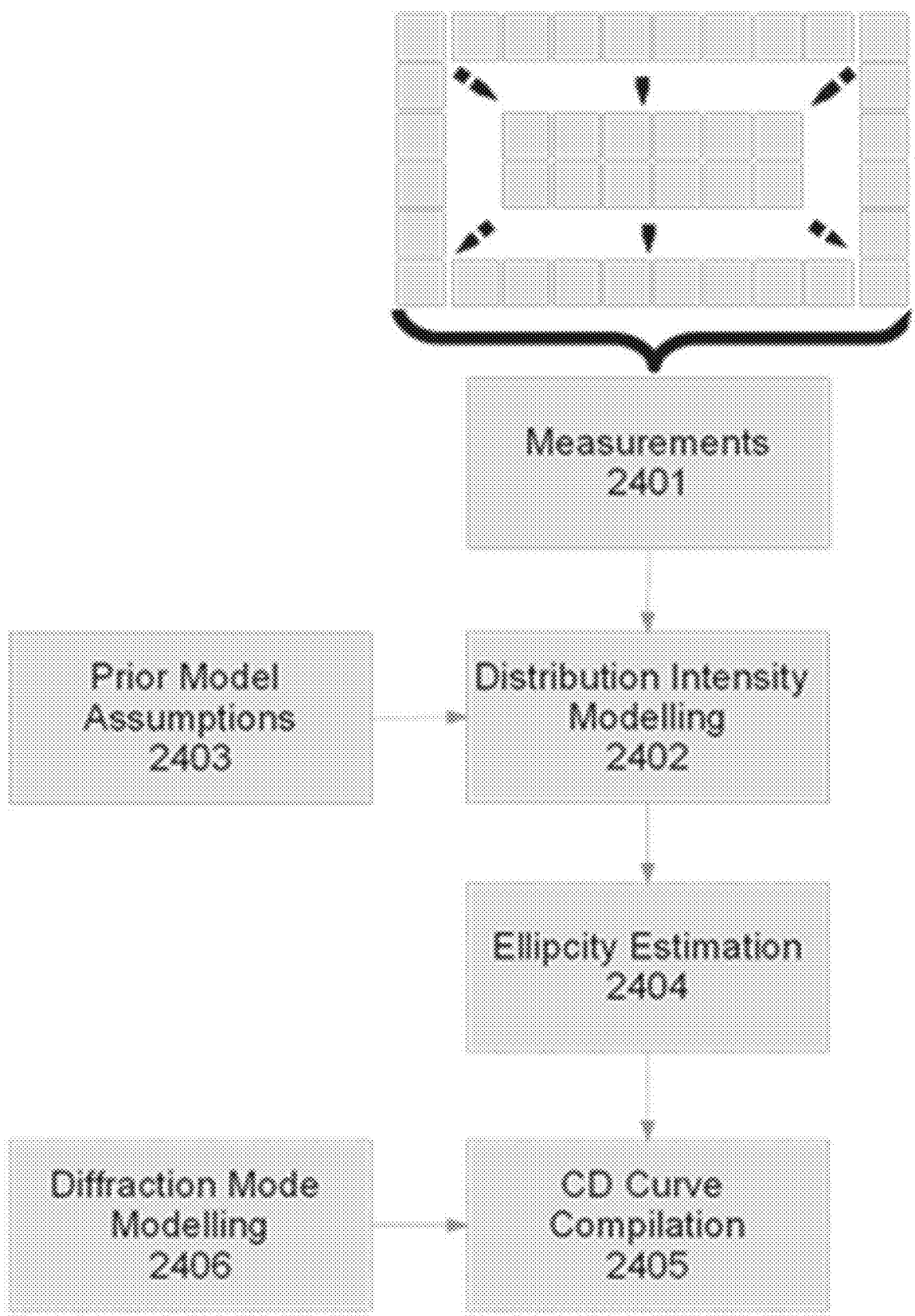
FIG. 24 shows an illustration of the Digital Signal Processing unit's flow of information in accordance with embodiment 9.

Referring to FIG. 24, shown is an illustrative process executed by DSP 2312 for this embodiment. The DSP 2312 takes the measurements from the two-dimensional detector array 2306 and uses distribution intensity modelling to remove any confounding factors from the measurements using prior assumptions of the intensity distributions using methods including, but not limited to, maximum a posteriori probabilistic parametric/non-parametric estimation. Once the confounding factors have been removed, using theoretical models, the measurements of Beam 1 and Beam 2 are combined to estimate the phase delay between the linear orthogonal polarization and from there used to estimate the ellipticity of the beam that left the sample for each copy of the distribution from each mode that leaves the low-efficiency diffraction grating.

Tenth Embodiment

Figure 25:
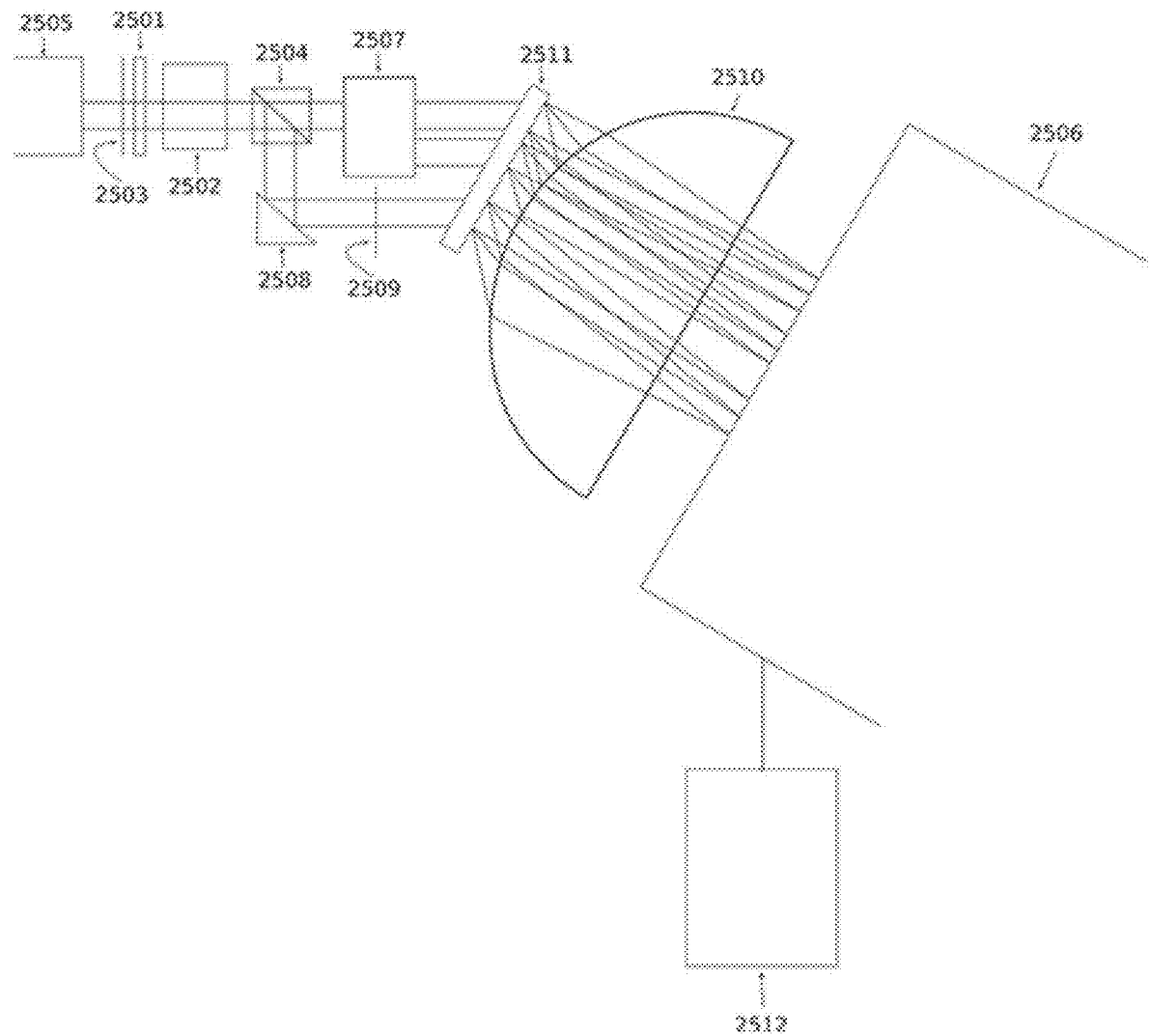
FIG. 25 shows an illustrative system and method for performing light polarization measurement in accordance with embodiment 10.

Now referring to FIG. 25, shown is another embodiment of the presented system and method. In this embodiment, the system includes a series of monochromatic illumination sources or a broadband illumination sources 2505, a linear polarizer 2503, a half-wave vortex retarder waveplate 2501, a sample of the drug in solution with its target molecule 2502, an optic 2504 that splits the beam by power, a birefringent crystal 2507 that causes a lateral displacement between two orthogonal lineal polarization states, a reflecting surface 2508, a circular polarizer 2509, a diffraction grating 2511, a focusing optic 2510, a two-dimensional sensor array 2506, and a DSP system 2512.

In operation, illumination from the series of monochromatic illumination sources or a broadband illumination source 2505 will pass through the optical system, except that rather than passing through a second and final linear polarizer after the sample 2502, the beam will be split by optic 2504 based on a power ratio in two different directions. These are referred to as Beam 1 and Beam 2. Beam 1 will then interact with a birefringent crystal 2507 that converts Beam 1 into two beams with orthogonal polarizations, relative to each other. Beam 2 will be reflected off surface 2508 and then passed through circular polarizer 2509. This polarizer 2509 will change the intensity of the beam and include an intensity change due to the phase difference between the orthogonal light beams from Beam 1. Beam 1 and Beam 2 will then be dispersed through a diffraction grating and focused onto the two-dimensional detector array resulting in three rows of intensities. The measurements of the three rows are passed into a DSP 2512 and the CD curve is produced. This CD curve is used in the DSP 2512 to estimate the binding constant.

Figure 26:
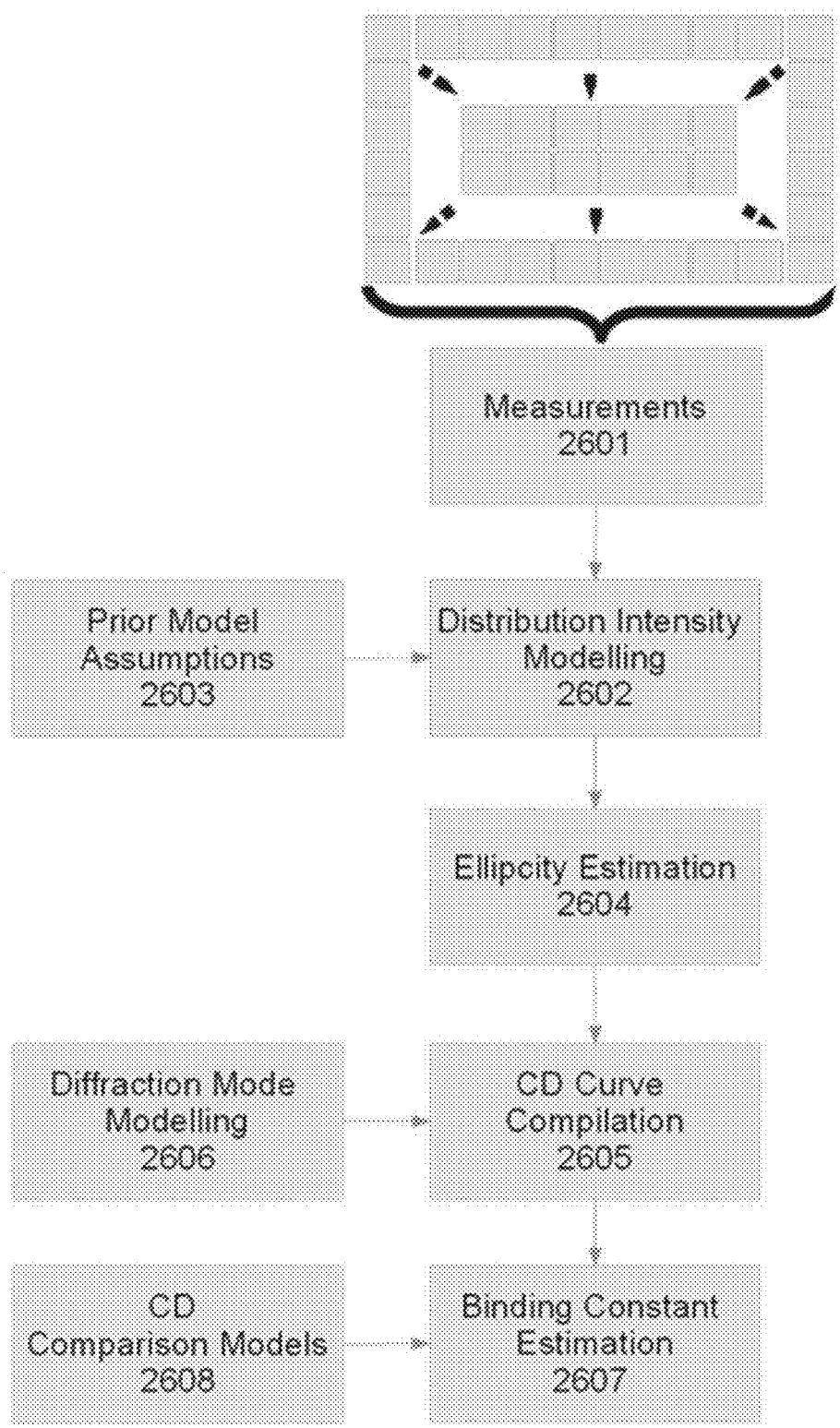
FIG. 26 shows an illustration of the Digital Signal Processing unit's flow of information in accordance with embodiment 10.

Referring to FIG. 26, an illustrative process performed by DSP 2512 for this embodiment is illustrated. The DSP 2512 takes the measurements from the two-dimensional detector array and uses distribution intensity modelling to remove any confounding factors from the measurements using prior assumptions of the intensity distributions using methods including, but not limited to, maximum a posteriori probabilistic parametric/non-parametric estimation. Once the confounding factors have been removed, using theoretical models, the measurements of Beam 1 and Beam 2 are combined to estimate the phase delay between the linear orthogonal polarization and from there used to estimate the ellipticity of the beam that left the sample for each copy of the distribution from each mode that leaves the diffraction grating. Using diffraction mode modelling, the CD curve can be produced and then from the CD curve, the binding constant of the drug is estimated.

Figure 27:
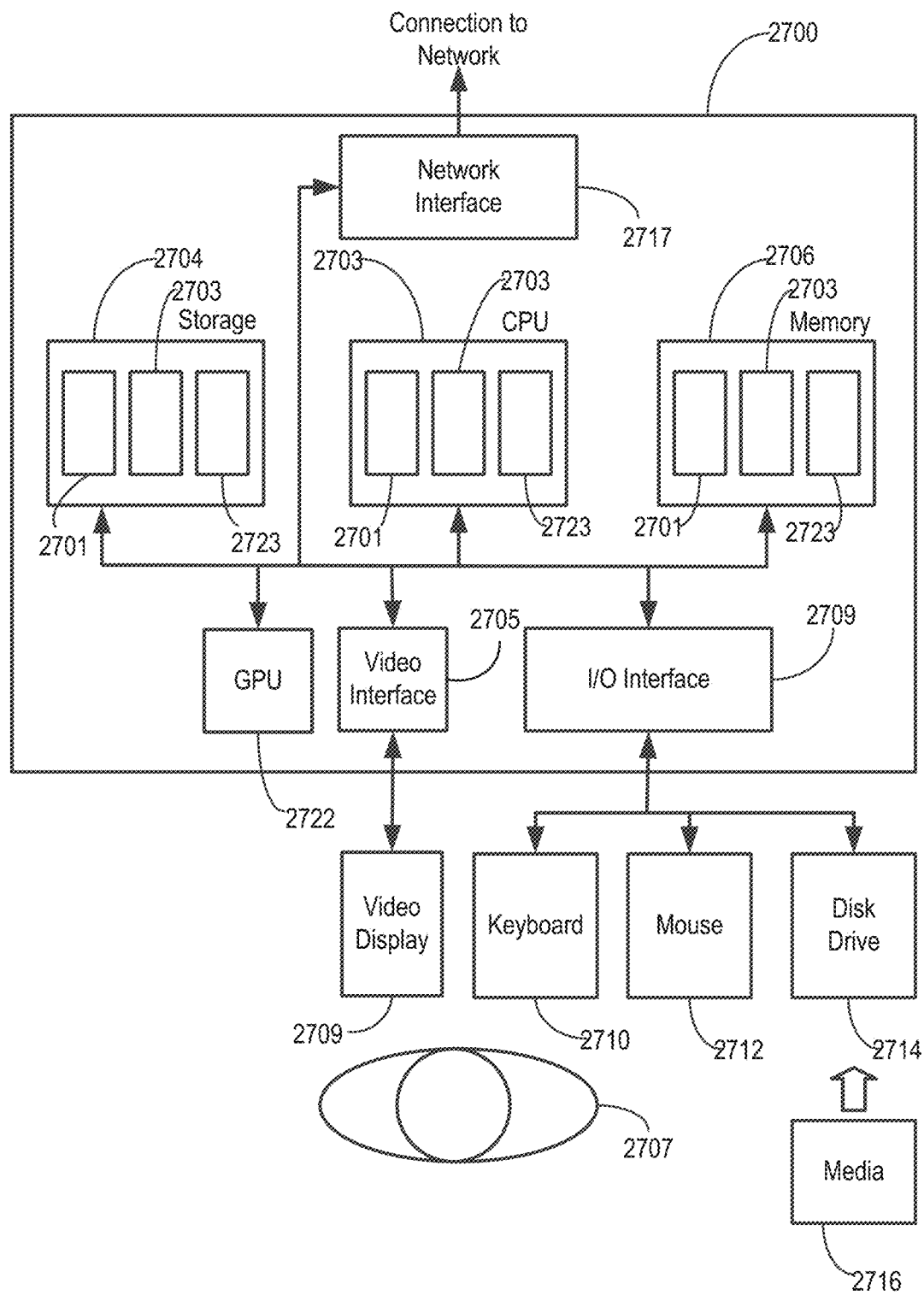
FIG. 27 shows a schematic block diagram of a generic computing device which may provide a processing platform for enabling various embodiments.

Now referring to FIG. 27, a suitably configured computer device which may serve as the DSP referenced above, and associated communications networks, devices, software and firmware which may provide a platform for enabling one or more of the above described embodiments. By way of example, FIG. 27 shows a generic computer device 2700 that may include a central processing unit ("CPU") 2702 connected to a storage unit 2704 and to a random access memory 2706. The CPU 2702 may process an operating system 2701, application program 2703, and data 2723. The operating system 2701, application program 2703, and data 2723 may be stored in storage unit 2704 and loaded into memory 2706, as may be required. Computer device 2700 may further include a graphics processing unit (GPU) 2722 which is operatively connected to CPU 2702 and to memory 2706 to offload intensive image processing calculations from CPU 2702 and run these calculations in parallel with CPU 2702. An operator 2710 may interact with the computer device 2700 using a video display 2708 connected by a video interface 2705, and various input/output devices such as a keyboard 2710, pointer 2712, and storage 2714 connected by an I/O interface 2709. In known manner, the pointer 2712 may be configured to control movement of a cursor or pointer icon in the video display 2708, and to operate various graphical user interface (GUI) controls appearing in the video display 2708. The computer device 2700 may form part of a network via a network interface 2711, allowing the computer device 2700 to communicate with other suitably configured data processing systems or circuits. One or more different types of sensors 2730 connected via a sensor interface 2732 may be used to search for and sense input from various sources. The sensors 2730 may be built directly into the generic computer device 2700, or optionally configured as an attachment or accessory to the generic computer device 2700.

Thus, in an aspect, there is provided a method of measuring polarization of light, comprising: (i) providing an illumination source for producing an illumination beam; (ii) passing the illumination beam through a first polarizer to create an illumination beam with a homogeneous spatial polarization profile; (iii) passing the illumination beam with a homogeneous spatial polarization profile through a spatially heterogeneous half wave retarder and generating a spatially-inhomogeneous polarized beam; (iv) detecting a change in the spatially-inhomogeneous polarized beam utilizing a sensor-array upon introduction of a sample in the path of the spatially-inhomogeneous polarized beam; and (v) digitally processing any change in the spatially-inhomogeneous polarized beam detected by the sensor-array to identify a characteristic of the sample.

In an embodiment, the sensor-array is a two-dimensional sensor array, and the method further comprises, after step (iii), passing the spatially-inhomogeneous polarized beam through a second polarizer oriented at an arbitrary angle relative to the first polarizer.

In another embodiment, the method further comprises passing the spatially-inhomogeneous polarized beam through a wavefront manipulation mechanism before step (iv).

In another embodiment, the method further comprises utilizing one or more of a lens, a micro-lens array, and mirrors as the wavefront manipulation mechanism.

In another embodiment, the method further comprises providing a diffraction grating to disperse the beams; and measuring the beams' dispersed intensity profile utilizing the two-dimensional sensor array.

In another embodiment, the method further comprises providing a wavefront manipulation mechanism to focus the dispersed beam onto the two-dimensional sensor array.

In another embodiment, the method further comprises providing a sample containing a target molecule in a solution; and detecting the target molecule in the sample solution based on a change in the spatially-inhomogeneous polarized beam after passing through the sample solution.

In another embodiment, the method further comprises providing an optic that splits the beam by power; and for a first split beam, utilizing a birefringent crystal to cause lateral displacement between two orthogonal linear polarization states; for a second split beam, reflecting the mean through a circular polarizer; wherein the first and second split beams are detected on different areas of a two-dimensional sensor array; and measuring the intensity profiles of the first split beam and the second split beams to determine an ellipticity of the illumination beam after passing through a sample.

In another embodiment, the method further comprises providing a diffraction grating to disperse the beams; and measuring the intensity profile of the beams to determine the ellipticity of the light across many wavelengths simultaneously.

In another embodiment, the method further comprises providing a low-efficiency transmission diffraction grating.

In another embodiment, the method further comprises providing a sample containing a target molecule in a solution; and detecting the target molecule in the sample solution based on a change in the spatially-inhomogeneous polarized beam after passing through the sample solution.

In another embodiment, the method further comprises providing a modular set of components positioned after the sample to reject any scattered rays resulting from the illumination beam passing through the sample, thus increasing signal fidelity when detecting a change in the spatially-inhomogeneous polarized beam.

In another embodiment, the modular set of components comprise a first lens, a spatial filter, and a second lens configured to reject any scattered rays.

In another aspect, there is provided a system for measuring polarization of light, comprising: an illumination source for producing an illumination beam; a first polarizer adapted to pass the illumination beam and create an illumination beam with a homogeneous spatial polarization profile; a spatially heterogeneous half wave retarder adapted to pass the illumination beam with a homogeneous spatial polarization profile and generate a spatially-inhomogeneous polarized beam; a sensor-array adapted to detect a change in the spatially-inhomogeneous polarized beam upon introduction of a sample in the path of the spatially-inhomogeneous polarized beam; and a processor for digitally processing any change in the spatially-inhomogeneous polarized beam detected by the sensor-array to identify a characteristic of the sample.

In another embodiment, the sensor-array is a two-dimensional sensor array, and a second polarizer is oriented at an arbitrary angle relative to the first polarizer to pass the spatially-inhomogeneous polarized beam.

In another embodiment, the system further comprises a wavefront manipulation mechanism positioned before the sensor-array.

In another embodiment, the wavefront manipulation mechanism is one or more of a lens, a micro-lens array, and mirrors.

In another embodiment, the system further comprises a diffraction grating adapted to disperse the beams; and a two-dimensional sensor array adapted to measure the beams' dispersed intensity profile.

In another embodiment, the system further comprises a wavefront manipulation mechanism adapted to focus the dispersed beam onto the two-dimensional sensor array.

In another embodiment, the system is further adapted to detect a target molecule in a sample solution, based on a change in the spatially-inhomogeneous polarized beam after passing through the sample solution.

In another embodiment, the system further comprises an optic that splits the beam by power, wherein the system is further adapted to: utilize, for a first split beam, a birefringent crystal to cause lateral displacement between two orthogonal linear polarization states; and reflect a second split beam through a circular polarizer; wherein the first and second split beams are detected on different areas of a two-dimensional sensor array; and measure the intensity profiles of the first split beam and the second split beams to determine an ellipticity of the illumination beam after passing through a sample.

In another embodiment, the system further comprises a diffraction grating to disperse the beams, wherein the system is further adapted to measure the intensity profile of the beams to determine the ellipticity of the light across many wavelengths simultaneously.

In another embodiment, the system further comprises a modular set of components positioned after the sample to reject any scattered rays resulting from the illumination beam passing through the sample, thus increasing signal fidelity when detecting a change in the spatially-inhomogeneous polarized beam.

In an embodiment, the modular set of components comprise a first lens, a spatial filter, and a second lens, all configured to reject any scattered rays.

While illustrative embodiments have been described above by way of example, it will be appreciated that various changes and modifications may be made without departing from the scope of the system and method, which is defined by the following claims.

The invention claimed is:

1. A method of measuring polarization of light, comprising:
   (i) providing an illumination source for producing an illumination beam;
   (ii) passing the illumination beam through a first polarizer to create an illumination beam with a homogeneous spatial polarization profile;
   (iii) passing the illumination beam with a homogeneous spatial polarization profile through a spatially heterogeneous half wave retarder and generating a spatially-inhomogeneous polarized beam;
   (iv) detecting a change in the spatially-inhomogeneous polarized beam utilizing a sensor-array upon introduction of a sample in the path of the spatially-inhomogeneous polarized beam; and
   (v) digitally processing any change in the spatially-inhomogeneous polarized beam detected by the sensor-array to identify a characteristic of the sample.

2. The method of claim 1, wherein the sensor-array is a two-dimensional sensor array, and the method further comprises, after step (iii), passing the spatially-inhomogeneous polarized beam through a second polarizer oriented at an arbitrary angle relative to the first polarizer.

3. The method of claim 2, further comprising passing the spatially-inhomogeneous polarized beam through a wavefront manipulation mechanism before step (iv).

4. The method of claim 3, further comprising utilizing one or more of a lens, a micro-lens array, and mirrors as the wavefront manipulation mechanism.

5. The method of claim 2, further comprising:
   providing a diffraction grating to disperse the beams; and
   measuring the beams' dispersed intensity profile utilizing the two-dimensional sensor array.

6. The method of claim 5, further comprising providing a wavefront manipulation mechanism to focus the dispersed beam onto the two-dimensional sensor array.

7. The method of claim 6, further comprising:
   providing a sample containing a target molecule in a solution; and detecting the target molecule in the sample solution based on a change in the spatially-inhomogeneous polarized beam after passing through the sample solution.

8. The method of claim 1, further comprising:
providing an optic that splits the beam by power; and
for a first split beam, utilizing a birefringent crystal to cause lateral displacement between two orthogonal linear polarization states;
for a second split beam, reflecting the mean through a circular polarizer;
wherein the first and second split beams are detected on different areas of a two-dimensional sensor array; and
measuring the intensity profiles of the first split beam and the second split beams to determine an ellipticity of the illumination beam after passing through a sample.

9. The method of claim 8, further comprising:
providing a diffraction grating to disperse the beams; and
measuring the intensity profile of the beams to determine the ellipticity of the light across many wavelengths simultaneously.

10. The method of claim 8, further comprising providing a low-efficiency transmission diffraction grating.

11. The method of claim 10, further comprising:
providing a sample containing a target molecule in a solution; and
detecting the target molecule in the sample solution based on a change in the spatially-inhomogeneous polarized beam after passing through the sample solution.

12. The method of claim 1, further comprising:
providing a modular set of components positioned after the sample to reject any scattered rays resulting from the illumination beam passing through the sample, thus increasing signal fidelity when detecting a change in the spatially-inhomogeneous polarized beam.

13. The method of claim 12, wherein the modular set of components comprise a first lens, a spatial filter, and a second lens configured to reject any scattered rays.

14. A system for measuring polarization of light, comprising:
an illumination source for producing an illumination beam;
a first polarizer adapted to pass the illumination beam and create an illumination beam with a homogeneous spatial polarization profile;
a spatially heterogeneous half wave retarder adapted to pass the illumination beam with a homogeneous spatial polarization profile and generate a spatially-inhomogeneous polarized beam;
a sensor-array adapted to detect a change in the spatially-inhomogeneous polarized beam upon introduction of a sample in the path of the spatially-inhomogeneous polarized beam; and
a processor for digitally processing any change in the spatially-inhomogeneous polarized beam detected by the sensor-array to identify a characteristic of the sample.

15. The system of claim 14, wherein the sensor-array is a two-dimensional sensor array, and a second polarizer is oriented at an arbitrary angle relative to the first polarizer to pass the spatially-inhomogeneous polarized beam.

16. The system of claim 15, further comprising a wavefront manipulation mechanism positioned before the sensor-array.

17. The system of claim 16, wherein the wavefront manipulation mechanism is one or more of a lens, a microlens array, and mirrors.

18. The system of claim 15, further comprising:
a diffraction grating adapted to disperse the beams; and
a two-dimensional sensor array adapted to measure the beams' dispersed intensity profile.

19. The system of claim 18, further comprising a wavefront manipulation mechanism adapted to focus the dispersed beam onto the two-dimensional sensor array.

20. The system of claim 19, wherein the system is further adapted to detect a target molecule in a sample solution, based on a change in the spatially-inhomogeneous polarized beam after passing through the sample solution.

21. The system of claim 20, further comprising an optic that splits the beam by power, wherein the system is further adapted to:
utilize, for a first split beam, a birefringent crystal to cause lateral displacement between two orthogonal linear polarization states; and
reflect a second split beam through a circular polarizer;
wherein the first and second split beams are detected on different areas of a two-dimensional sensor array; and
measure the intensity profiles of the first split beam and the second split beams to determine an ellipticity of the illumination beam after passing through a sample.

22. The system of claim 21, further comprising a diffraction grating to disperse the beams, wherein the system is further adapted to measure the intensity profile of the beams to determine the ellipticity of the light across many wavelengths simultaneously.

23. The system of claim 14, further comprising a modular set of components positioned after the sample to reject any scattered rays resulting from the illumination beam passing through the sample, thus increasing signal fidelity when detecting a change in the spatially-inhomogeneous polarized beam.

24. The method of claim 23, wherein the modular set of components comprise a first lens, a spatial filter, and a second lens, all configured to reject any scattered rays.

* * * * *